(12) United States Patent
Okamoto et al.

(10) Patent No.: US 7,684,305 B2
(45) Date of Patent: Mar. 23, 2010

(54) OPTICAL PICKUP, OPTICAL RECORDING AND REPRODUCING APPARATUS AND TRACKING ERROR SIGNAL DETECTING METHOD

(75) Inventors: Yoshiki Okamoto, Kanagawa (JP); Katsuhiro Seo, Kanagawa (JP)

(73) Assignee: Sony Corporation, Tokyo (JP)

( * ) Notice: Subject to any disclaimer, the term of this patent is extended or adjusted under 35 U.S.C. 154(b) by 669 days.

(21) Appl. No.: 11/598,579

(22) Filed: Nov. 14, 2006

(65) Prior Publication Data
US 2007/0109930 A1    May 17, 2007

(30) Foreign Application Priority Data
Nov. 16, 2005   (JP) ............................. 2005-332091

(51) Int. Cl.
*G11B 7/00*     (2006.01)
(52) U.S. Cl. .............................. 369/112.05; 369/44.37; 369/44.41; 369/112.07
(58) Field of Classification Search .............. 369/44.23, 369/44.37, 44.41, 112.05, 112.07, 112.12
See application file for complete search history.

(56) References Cited

U.S. PATENT DOCUMENTS

| | | | | |
|---|---|---|---|---|
| 5,761,174 A | * | 6/1998 | Takeda et al. ............. | 369/44.37 |
| 5,963,515 A | * | 10/1999 | Shindo ..................... | 369/44.23 |
| 6,282,164 B1 | * | 8/2001 | Katayama ............... | 369/112.12 |
| 6,707,773 B2 | * | 3/2004 | Katayama ............... | 369/112.12 |
| 6,963,522 B2 | * | 11/2005 | Katayama ................ | 369/44.37 |
| 7,136,344 B2 | * | 11/2006 | Katayama .............. | 369/112.05 |

FOREIGN PATENT DOCUMENTS

| JP | 61-09246 | 5/1986 |
|---|---|---|
| JP | 2003-30892 A | 1/2003 |

* cited by examiner

*Primary Examiner*—Thang V Tran
(74) *Attorney, Agent, or Firm*—Rader, Fishman & Grauer PLLC

(57) ABSTRACT

An optical pickup includes an optical system in which light from a light source is introduced through an objective lens into an optical recording medium and in which light reflected from the optical recording medium is introduced into a light-receiving unit and an objective lens driving unit for driving the objective lens based on a light output detected at said light-receiving unit. In this optical pickup, a diffraction element is provided between the light source and the objective lens, the diffraction element is provided with at least first and second diffraction areas and the first and second diffraction areas have such grating shapes that ± first-order diffracted lights diffracted are received by the light-receiving unit at the position in which 0-th order light and ± first-order diffracted lights generated from guide grooves of the optical recording medium may not overlap with each other.

14 Claims, 18 Drawing Sheets

FIG. 3
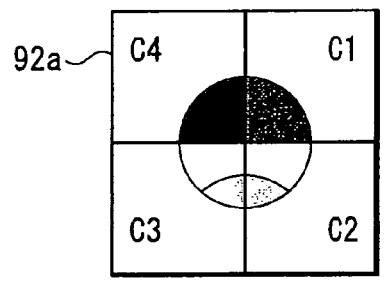
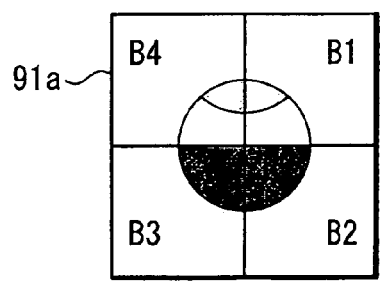
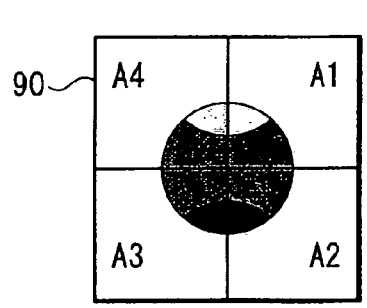
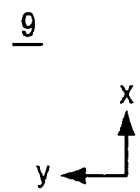
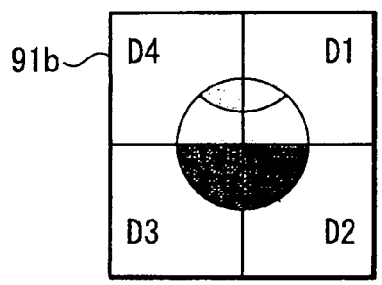
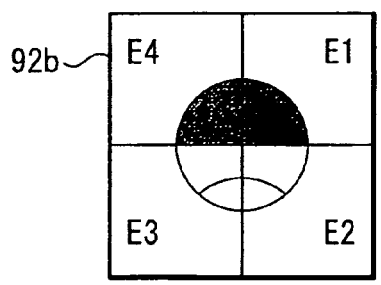

FIG. 6
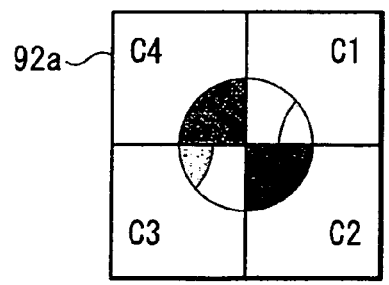
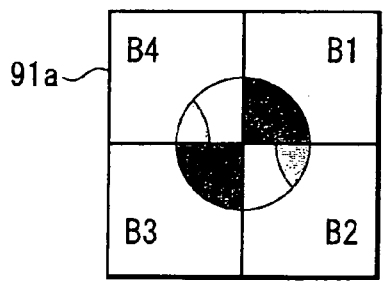
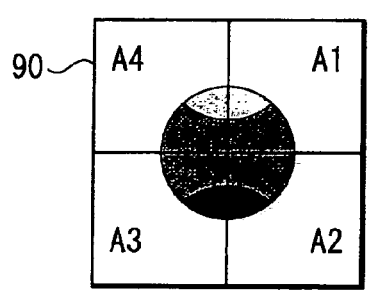
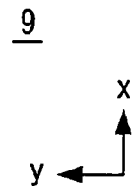
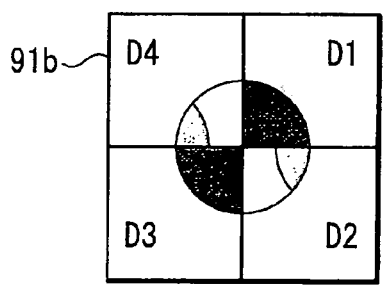
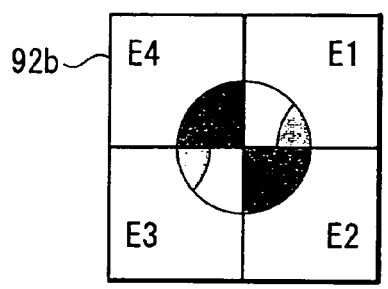

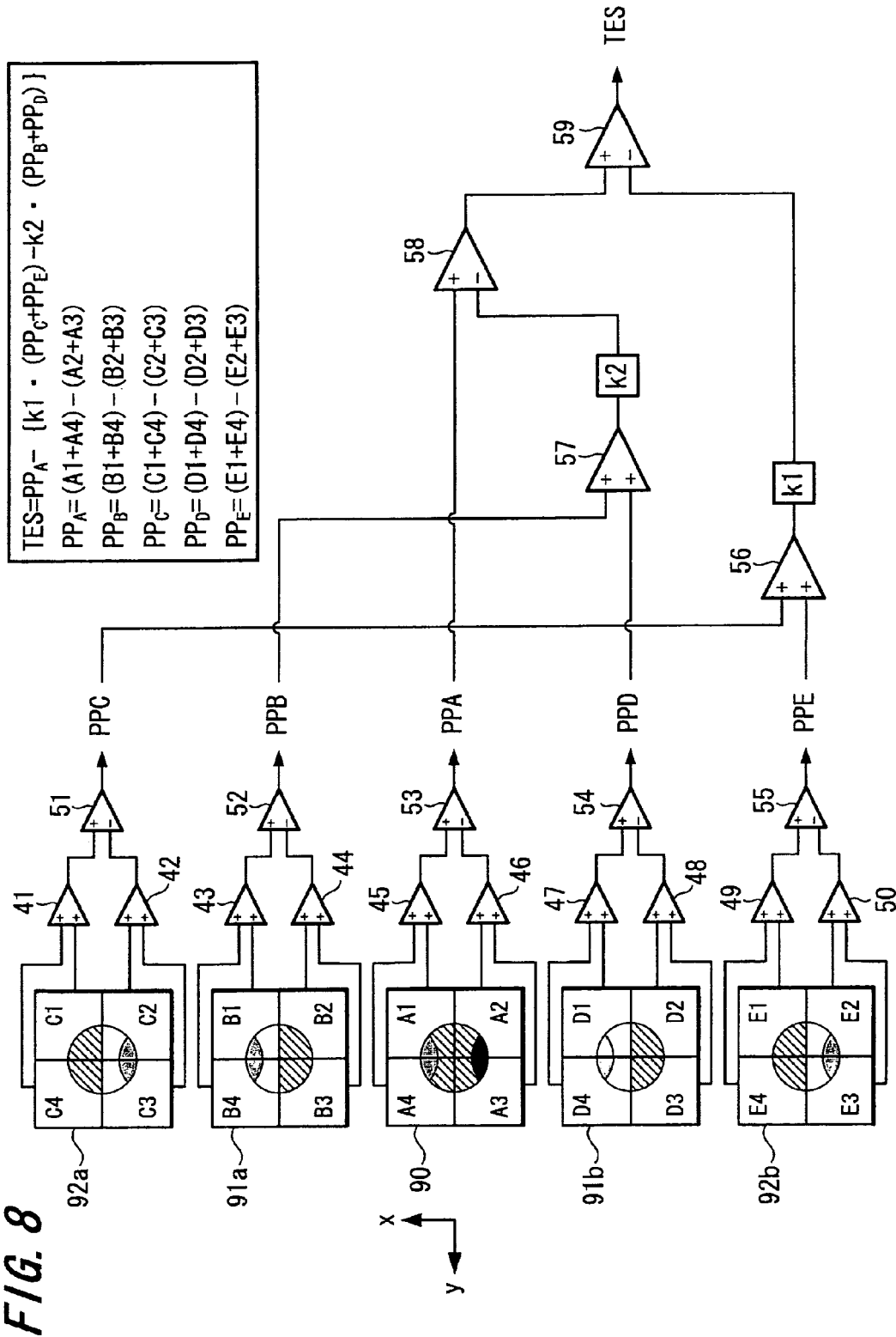

Focus Error Signal Based on Ordinary Astigmatism of Method

Focus Error Signal Based on Ordinary Astigmatism of Method

Focus Error Signal Based on Astigmatism Method of First Area

Focus Error Signal Based on Astigmatism Method of First Area

Focus Error Signal Based on Astigmatism Method of Second Area

Focus Error Signal Based on Astigmatism Method of Second Area

Sum of Focus Error Signals Generated from First and Second Areas

Sum of Focus Error Signals Generated from First and Second Areas

OPTICAL PICKUP, OPTICAL RECORDING AND REPRODUCING APPARATUS AND TRACKING ERROR SIGNAL DETECTING METHOD

CROSS REFERENCES TO RELATED APPLICATIONS

The present invention contains subject matter related to Japanese Patent Application JP 2005-332091 filed in the Japanese Patent Office on Nov. 16, 2005, the entire contents of which being incorporated herein by reference.

BACKGROUND OF THE INVENTION

1. Field of the Invention

The present invention relates to an optical pickup, an optical recording and reproducing apparatus and a tracking error signal detecting method useful for optically recording and reproducing information on and from an optical recording medium such as an optical disc and an optical card.

2. Description of the Related Art

In recent years, various types of optical recording mediums with different recording densities have been developed. For example, a CD (Compact Disc) of which available wavelength of laser light is near 780 nm, for example, a DVD (Digital Versatile Disc) of which available wavelength of laser light is near 660 nm, a BD (Blu-ray Disc: Registered Trademark) of which available wavelength of laser light is near 405 nm, a HD-DVD (High Definition DVD) of which available wavelength of laser light is near 405 nm might be numerated as disc-like optical recording mediums, for example.

These optical recording mediums are respectively different in structure. In order to increase a recording density, a track pitch of 1.6 μm of the CD type optical recording medium is microminiaturized as a track pitch of 0.74 μm in DVD type optical recording medium and it is also microminiaturized as a track pitch of approximately 0.3 to 0.35 μm in the BD type optical recording medium.

With respect to the recording track of which track width is microminiaturized as described above, it is necessary to locate light emitted from a light source at target recording tracks with high accuracy.

A DPP (Differential Push-Pull) method is widely used as a method for correcting offset of an objective lens, that is, shift of an optical axis of the objective lens in a tracking method using a push-pull signal (see Cited Patent Reference 1, for example).

According to this DPP method, light traveling from the light source to the optical recording medium is divided into three lights, two sub-beams are irradiated on the position shifted by ½ of the track pitch of the recording track with high accuracy in the radial direction on the surface of the optical recording medium relative to the middle main beam and the tracking error can be detected and the offset of the objective lens can be canceled by detecting these lights at the receiving units.

[Cited Patent Reference 1]: U.S. Pat. No. 4,775,968

[Cited Patent Reference 2]: Japanese Unexamined Patent Publication No. 2003-30892

SUMMARY OF THE INVENTION

As described above, in the tracking error detecting method according to the related-art DPP method, three divided lights on the outward light path of light traveling from the light source to the optical recording medium should be irradiated on target positions of the recording tracks of the optical recording medium with high accuracy. Accordingly, it is unavoidable that the above-mentioned related-art tracking error detecting method encounters with the following problems:

(a) Sub-beams should be located on the tracks of the optical recording medium with high accuracy;

(b) A main beam should be located on the seek axis which is a straight line of the radius direction passing through the rotation center of the optical recording medium with high accuracy; and (c) It is difficult to obtain a large distance between the sub-beams and the main beam due to the above-described problem (a) and hence design of the light-receiving unit is difficult.

However, there has not yet been proposed a method capable of alleviating position alignment accuracy of the sub-beams and which can correct an offset of an objective lens with high accuracy.

It should be noted that an optical disc apparatus has been proposed to divide a beam into five beams by using a two-divided diffraction grating divided to two areas different by diffraction angles and/or diffraction directions in order to obtain a push-pull signal which corrects an offset of an objective lens by one optical pickup relative to optical recording mediums with different track pitches (see Cited Patent Reference 2, for example). In this case, when the bisecting diffraction grating is in use, the push-pull signal can be obtained by irradiating the optical recording mediums of different kinds with diffracted lights shifted by each ½ of different track pitches. Therefore, it is possible to detect a tracking error signal with compatibility with optical discs of different kinds.

However, in this case, since the beam is divided into five beams by the bisecting diffraction grating, it is unavoidable that utilization factor of light will be lowered. Also, there still remain problems in which a main beam and sub-beams should be located on the tracks of the optical recording medium with high accuracy and in which the main beam should be located on the seek axis of the optical recording medium with high accuracy.

In view of the aforesaid aspects, the present invention intends to provide an optical pickup, an optical recording and reproducing apparatus and a tracking error signal detecting method capable of correcting an offset of an objective lens when a tracking error is detected and in which light beams need not be located on the tracks of the optical recording medium with high accuracy.

According to an aspect of the present invention, there is provided an optical pickup including an optical system in which light from a light source is introduced through an objective lens into an optical recording medium and in which light reflected from the optical recording medium is introduced into a light-receiving unit and an objective lens driving unit for driving the objective lens based on a light output detected at said light-receiving unit. In this optical pickup, a diffraction element is provided between the light source and the objective lens, the diffraction element is provided with at least first and second diffraction areas and the first and second diffraction areas have such grating shapes that ±first-order diffracted lights diffracted are received by the light-receiving unit at the position in which 0-th order light and ±first-order diffracted lights generated from guide grooves of the optical recording medium may not overlap with each other.

Also, in the above-mentioned optical pickup according to the present invention, the diffraction element has the first and second diffraction areas in which an area in which ±first-order diffracted lights diffracted by the guide grooves and 0-th order light overlap with each other is divided with a space expressed as:

$$d=\{\lambda/(p\times NA)\}\times R$$

where λ represents the wavelength of light emitted from the light source, NA represents the numerical aperture of the objective lens, R represents the pupil radius and p represents the track pitch of the optical recording medium.

Further, in the above-mentioned optical pickup according to the present invention, the diffraction element has different pitches of diffraction gratings provided in the first and second diffraction areas or the diffraction element has different diffraction directions of diffraction gratings provided in the first and second diffraction areas. Alternatively, in the above-mentioned optical pickup according to the present invention, the diffraction element has both of different pitches of diffraction gratings provided in the first and second diffraction areas and different diffraction directions of diffraction gratings provided in the first and second diffraction areas.

Also, according to other aspect of the present invention, there is provided an optical recording and reproducing apparatus including an optical pickup including an optical system in which light from a light source is introduced at least through an objective lens into an optical recording medium, light reflected from the optical recording medium being introduced into a light-receiving unit and an objective lens driving unit for driving the objective lens and which carries out recording and/or reproduction based on a light output detected at the light-receiving unit. In this optical recording and reproducing apparatus, a diffraction element is provided between the light source and the objective lens, the diffraction element is provided with at least first and second diffraction areas and the first and second diffraction areas have such grating shapes that ±first-order diffracted lights diffracted are received by the light-receiving unit at the position in which 0-th order light and ±first-order diffracted lights generated from guide grooves of the optical recording medium may not overlap with each other.

In accordance with a further aspect of the present invention, there is provided a tracking error signal detecting method in which light from a light source is irradiated on an optical recording medium through at least an objective lens and light reflected from the optical recording medium is detected at a light-receiving unit to thereby detect a tracking error signal. This tracking error signal detecting method includes the steps of providing a diffraction element between the light source and the objective lens, forming first and second diffraction areas with different pitches in the diffraction element and forming shapes of gratings of the first and second diffraction areas such that ±first-order diffracted lights diffracted are received by the light-receiving unit at the position in which 0-th order light and ±first-order diffracted lights generated from guide grooves of the optical recording medium may not overlap with each other. This tracking error signal detecting method further includes the step of detecting a tracking error signal from reflected lights of respective ±first-order diffracted lights diffracted by the first and second diffraction areas and 0-th order light after the ±first-order diffracted lights and the 0-th order light were reflected on the optical recording medium. Then, a tracking error signal is detected from light which results from reflecting the ±first-order lights diffracted by these first and second diffraction areas and the 0-th order light on the optical recording medium.

As described above, in the optical pickup, the optical recording and reproducing apparatus and the tracking error signal detecting method according to the present invention, the diffraction element is located between the light source and the optical recording medium. Then, this diffraction element is provided with at least the first and second diffraction areas. When lights diffracted by the respective diffraction areas are irradiated on the optical recording medium, reflected on the optical recording medium and introduced into the light-receiving unit, lights are received at this light-receiving unit in such a manner that the ±first-order diffracted lights diffracted by the guide grooves of the optical recording medium and the 0-th order light may not overlap with each other.

More specifically, since the ±first-order diffracted lights diffracted by the guide grooves of the optical recording medium and the 0-th order light overlap with each other with the space expressed by the above-mentioned equation (1), it is sufficient that the area corresponding to this area in which the ±first-order diffracted lights and the 0-th order light may overlap with each other may be divided as the first and second diffraction areas in the diffraction element.

For example, the pitches or diffraction directions of the diffraction gratings of the thus divided first and second diffraction areas or both of the pitches or diffraction directions are made different from each other, whereby the 0-th order light and the ±first-order diffracted lights diffracted by the guide grooves can be prevented from overlapping with each other.

According to the above-mentioned arrangement, in the lights in which the ±first-order diffracted lights diffracted by the diffraction element are reflected on the optical recording medium and received, the ±first-order diffracted lights diffracted by the guide grooves on the optical recording medium and the 0-th order light may not overlap with each other. Hence, this light has no modulated component produced by the guide grooves of the optical recording medium. Therefore, it is possible to detect the offset of the objective lens by calculating these ±first-order diffracted lights, that is, the signals obtained from the sub-beams. It is possible to obtain the tracking error signal in which the offset was corrected by subtracting the offset of the objective lens from the push-pull signal obtained from the 0-th order light (main beam) of the diffraction element.

Therefore, according to the optical pickup, the optical recording and reproducing apparatus and the tracking error signal detecting method of the present invention, the lights divided by the diffraction element need not be located on the tracks of the optical recording medium with high accuracy and also these lights need not be located on the seek axis of the objective lens with high accuracy. Also, it is possible to easily detect the tracking error signal with the offset being corrected by calculating the signals obtained at the light-receiving unit.

BRIEF DESCRIPTION OF THE DRAWINGS

FIG. 3 is a schematic plan view showing an arrangement of the embodiment of the light-receiving unit of the optical pickup according to the present invention;

FIG. 6 is a schematic plan view showing an arrangement of an embodiment of a light-receiving unit of an optical pickup according to the present invention;

FIG. 8 is a schematic block diagram showing an arithmetic circuit of an optical recording and reproducing apparatus according to an embodiment of the present invention;

DESCRIPTION OF THE PREFERRED EMBODIMENTS

Embodiments of the present invention will now be described below with reference to the drawings but it is needless to say that the present invention may not be limited to those embodiments which will follow.

Figure 1:
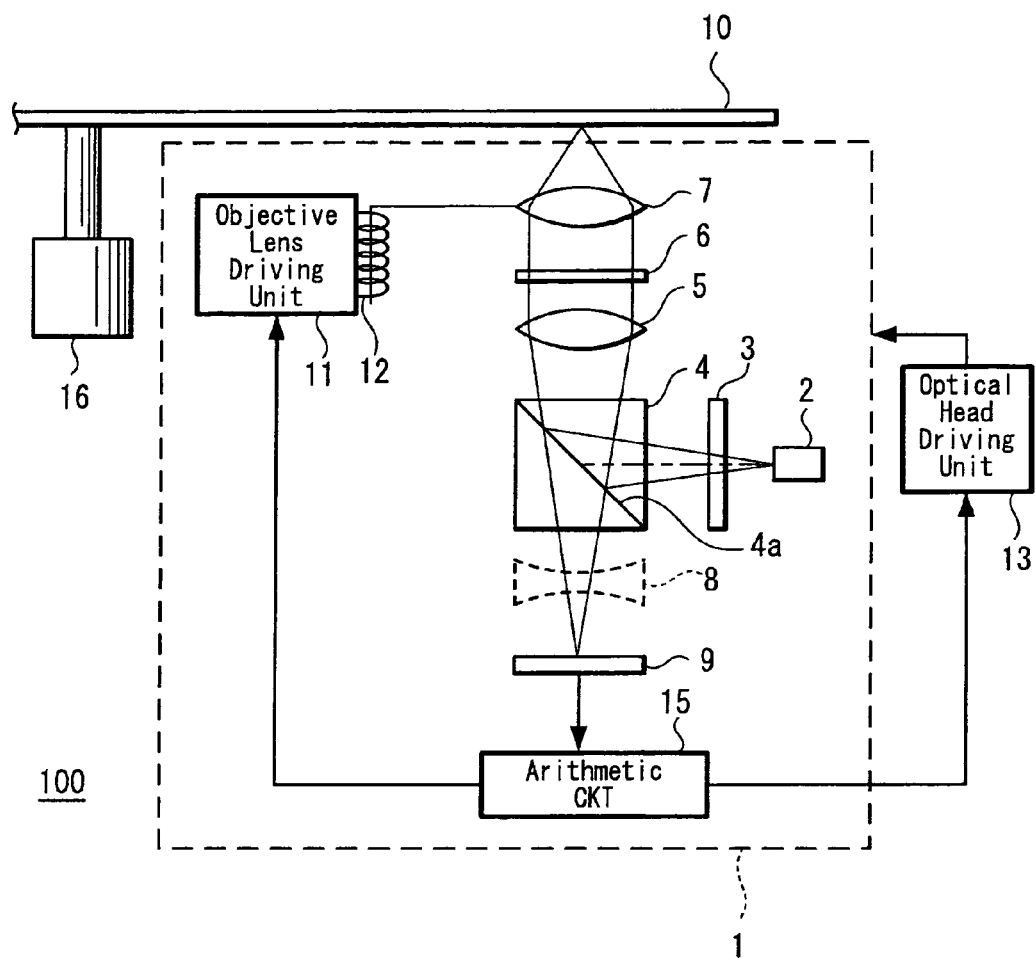
FIG. 1 is a schematic diagram showing, partly in a block form, an arrangement of an optical pickup and an optical recording and reproducing apparatus according to an embodiment of the present invention.

FIG. 1 of the accompanying drawings is a schematic diagram showing, partly in a block form, an arrangement of an example of an optical recording and reproducing apparatus including an optical pickup 1 that can realize a tracking error signal detecting method according to the present invention.

An optical recording and reproducing apparatus, generally depicted by reference numeral 100 in FIG. 1, includes a light source 2 formed of a suitable device such as a semiconductor laser, and an optical system for introducing light emitted from the light source 2 into an optical recording medium 10 having guide grooves (grooves) formed thereon, such as an optical disc.

As shown in FIG. 1, according to this embodiment, this optical system includes a diffraction element 3 having diffraction areas, which will be described later on, a polarizing beam splitter 4, a lens 5 formed of a suitable lens such as a collimator lens, a quarter-wave plate 6 and an objective lens 7. Also, this optical system includes an optical system for introducing light reflected from the optical recording medium 10 into a light-receiving unit 9. Here, this optical system includes the objective lens 7, the quarter-wave plate 6, the lens 5, the polarizing beam splitter 4 and a lens 8 formed of a suitable lens such as a multi-lens.

The objective lens 7 is connected with an objective lens driving unit 11 including an actuator 12 such as a biaxial actuator. Also, this optical recording medium 10 is fixedly held on a rotary driving unit 16 formed of a suitable device such as a spindle motor and it is thereby rotated at a predetermined speed upon recording and reproducing. A signal detected at the light-receiving unit 9 is outputted to an arithmetic circuit 15. It should be noted that the optical pickup 1 according to the present invention is shown by a broken-line block in FIG. 1.

According to the above-mentioned arrangement, laser light, for example, from the light source 2 is diffracted by the diffraction element 3 having diffraction areas, which will be described later on, introduced into the polarizing beam splitter 4, in which it is reflected on a polarization plane 4a, collimated into parallel light by the lens 5 such as the collimator lens, passed through the quarter-wave plate 6 and introduced onto the recording tracks of the optical recording medium 10 through the objective lens 7.

Light reflected from the optical recording medium 10 is passed through the quarter-wave plate 6 and the lens 5 from the objective lens 7. Light passed through the quarter-wave plate 6 twice is passed through the polarization plane 4a of the polarizing beam splitter 4 and introduced into the light-receiving surface of the light-receiving unit 9 through the lens 8.

Figure 4:
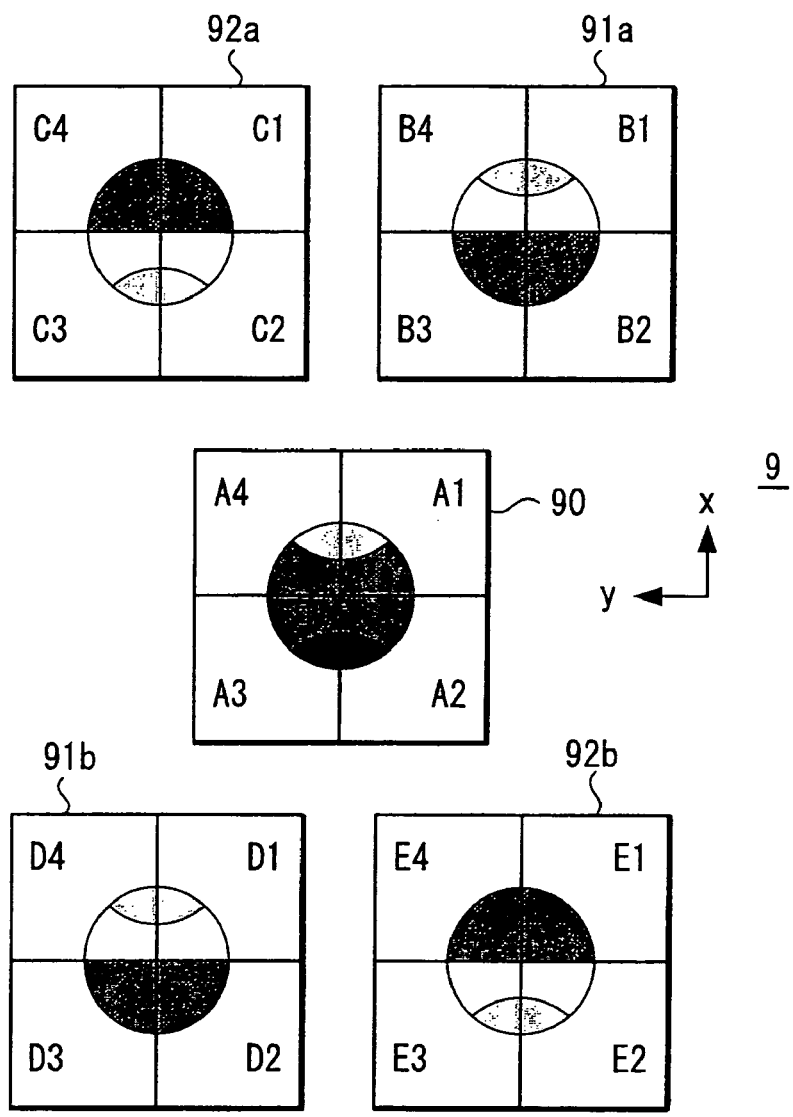
FIG. 4 is a schematic plan view showing an arrangement of the embodiment of the light-receiving unit of the optical pickup according to the present invention.

As shown in FIGS. 3, 4 and 6 which will be described later on, this light-receiving unit 9 is composed of first to fifth light-receiving elements having quadrant light-receiving areas divided along the direction in which tracks of the optical recording medium 10 are arrayed and the direction (so-called track direction) in which the track is extended. In other words, when the optical recording medium 10 is a disc-like optical disc, each light-receiving element is divided into four (quadrant) light-receiving areas along the radial (radius) direction of the track and the tangential (tangent line) direction of the track. It should be noted that the light-receiving unit 9 is located in such a manner that intersection points of divided lines of the respective light-receiving elements of the light-receiving unit 9 may be in substantially agreement with the intensity centers of intensity distributions of light introduced into the light-receiving unit 9 after it was reflected on the optical recording medium 10.

Then, light output detected at the light-receiving unit 9 is supplied to the arithmetic circuit 15, by which an RF (radio frequency) signal, a TE (tracking error) signal and an FE (focus error) signal are calculated. The RF signal is supplied to the arithmetic circuit 15, in which it is processed by suitable processing such as A/D (analog-to-digital) conversion and error-correction and thereby it is outputted as a recording and reproducing signal. The tracking error (TE) signal is outputted to the optical head driving unit 13 and/or the objective lens driving unit 11, by which the optical driving unit 13 and/or the objective lens driving unit 11 may be driven under tracking servo control. Also, the focus error (FE) signal is outputted to the objective lens driving unit 11, by which the objective lens driving unit 11 may be driven under control of focusing servo.

It should be noted that the focus error (FE) signal can be detected by supplying three-degree astigmatism to the above-mentioned lens 8 formed of the multi-lens based on an astigmatism method. Also, it is possible to obtain the focus error (FE) signal by other methods.

Next, a tracking error signal detecting method will be described.

The ±first-order diffracted lights diffracted by guide grooves (grooves) of the optical recording medium may overlap with 0-th order light with an offset amount d expressed by the above-described equation (1), that is, $$d = \{\lambda/(p \times NA)\} \times R \quad (1)$$

where λ represents the wavelength, p represents the cycle of the guide groove, NA represents the numerical aperture of the objective lens and R represents the radius of the pupil. This overlapping area is a modulated component (push-pull signal) obtained by diffraction of the guide groove and it is not necessary to detect only the offset of the objective lens.

Figure 2A:
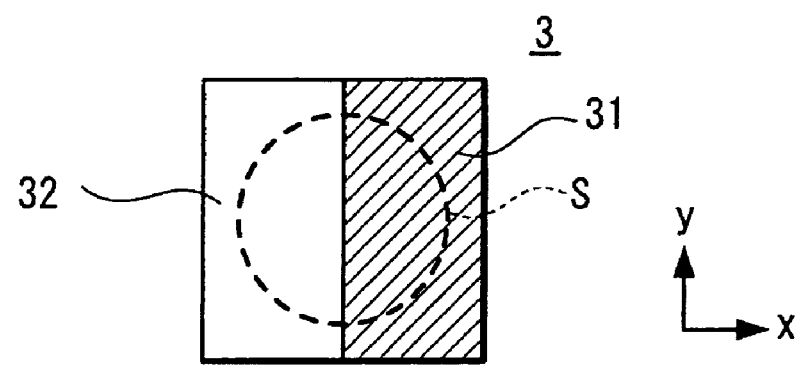
FIG. 2A is a schematic plan view showing an embodiment of a diffraction element for use with the optical pickup and the optical recording and reproducing apparatus according to the present invention.

Accordingly, as FIG. 2A shows a plan view of a schematic arrangement of an example of a diffraction element, let us consider the case which uses a diffraction element divided along the direction in which tracks of the optical recording medium are arrayed, that is, a diffraction element 3 having first and second diffraction areas 31 and 32 formed by a dividing line extending along the track extending direction (track direction). In FIG. 2A, an arrow y represents the direction that corresponds to the track extending direction (tangential direction if the optical recording medium is a disc-like medium) of the optical recording medium and an arrow x represents the direction that corresponds to the track array direction (radial direction if the optical recording medium is the disc-like medium) which is extended in the direction substantially perpendicular to the above-mentioned direction shown by the arrow y. At that time, in light from a first diffraction area 31 of the right half, for example, in FIG. 2A, 0-th order light and ±first-order diffracted lights may not overlap with each other if the following condition:

$$\{\lambda/(p \times NA)\} \times R < R \quad (2)$$

may be established.

Figure 2B:
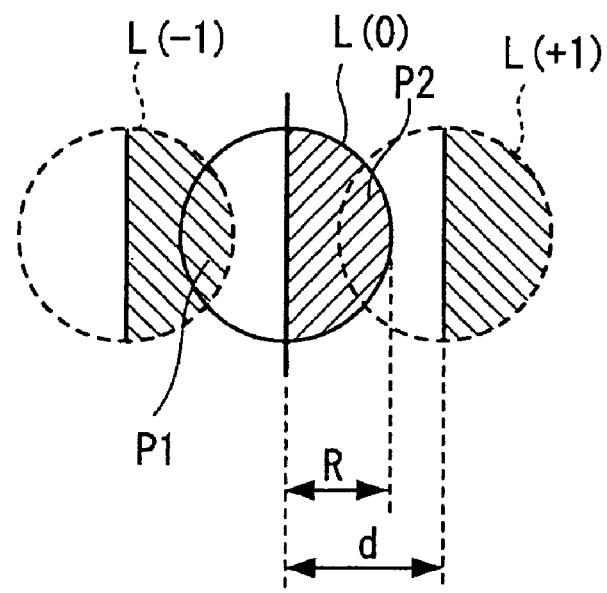
FIG. 2B is a diagram to which reference will be made in explaining shapes of light beams in a light-receiving unit of the embodiment of the diffraction element for use with the optical pickup and the optical recording and reproducing apparatus according to the present invention.

FIG. 2B shows this situation. More specifically, FIG. 2B shows the state in which 0-th order light L(0) and ±first-order diffracted lights L(+1) and L(−1) diffracted by the guide grooves of the optical recording medium are overlapping with each other. Signals at overlapping areas P1 and P2 represent push-pull modulated components.

If this 0-th order light L(0) and the ±first-order diffracted lights L(+1) and L(−1) are overlapping with each other by the space d, then when d>R is satisfied, it is to be understood that the area in which the 0-th order diffracted light and the ±first-order diffracted lights diffracted by the guide grooves are overlapping with each other may be removed from the right half area shown hatched in FIG. 2A. that is, returned light reflected by irradiating the ±first-order diffracted lights from the first diffraction area to the optical recording medium as the sub-beams.

Accordingly, if the shape of the grating of the diffraction grating, specifically, pitch or diffraction direction or both of the pitch and the diffraction direction of the diffraction grating are selected such that the diffracted lights that can satisfy the above-mentioned conditions are generated by the diffraction grating and the diffracted lights diffracted by the guide grooves of the optical recording medium are separated from each other by the light-receiving unit and the corresponding light receiving units are located such that sub-beams, that is, respective ±first-order diffracted lights from the first and second diffraction areas are detected, it becomes possible to detect only the offset of the objective lens.

Then, if a signal equivalent to this offset is subtracted from this push-pull signal of the main beam, then it is possible to obtain a tracking error signal in which offset does not occur relative to the offset of the objective lens.

FIG. 3 is a schematic plan view showing an arrangement of a light-receiving unit of an optical pickup used when light separated by the above-mentioned diffraction element shown in FIG. 2A is detected by a light-receiving unit composed of first to fifth light-receiving elements. In this case, diffraction areas 31 and 32 of the diffraction element 3 are made different in pitch of each diffraction grating and their diffraction directions are made substantially the same directions. For example, when astigmatism is given to the multi-lens 8 in the aforementioned optical pickup 1 shown in FIG. 1 in order to obtain a focus error signal, light beam is received by the light-receiving unit 9 in the state in which it is rotated 90 degrees from the direction in which the tracks are extended.

As shown in FIG. 3, this light-receiving unit 9 is composed of a first light-receiving element 90 located at the central portion to receive 0-th order light, a second light-receiving element 91a to receive ±first-order diffracted light diffracted from the aforementioned first diffraction area 31, for example, a third light-receiving element 91b to receive −first-order diffracted light, a fourth light-receiving element 92a to receive ±first-order diffracted light diffracted from the second diffraction area 32 and a fifth light-receiving element 92b to receive −first-order diffracted light diffracted from the second diffraction area 32. Then, in this case, pitches of the diffraction gratings in the respective diffraction areas 31 and 32 are selected in such a manner that lights diffracted from the first and second diffraction areas 31 and 32 may be separated by the light-receiving unit 9 as described above.

It should be noted that, if the diffraction directions of the diffraction gratings are made different in the first and second diffraction areas 31 and 32, then as shown in FIG. 4, for example, lights diffracted in the first and second diffraction areas 31 and 32 may be separated into the directions different from that of the 0-th order light. In this case, FIG. 4 shows the case in which the diffraction directions of the diffraction gratings in the respective diffraction areas 31 and 32 of the diffraction element 3 are made different from each other, the diffraction pitches thereof being made substantially the same. In FIG. 4, elements and parts identical to those of FIG. 3 are denoted by identical reference numerals and therefore need not be described.

Then, these light-receiving elements 90, 91a, 91b, 92a and 92b are respectively divided into four light-receiving areas along the direction in which the tracks are arrayed and in the direction in which the track is extended, that is, the radial direction of the track and the tangential direction of the track when the optical recording medium is the disc-like optical disc. In FIGS. 3 and 4, an arrow y represents the extending direction of the track and x represents the track array direction perpendicular to the track extending direction y. In other words, the offset of the objective lens is produced in the direction shown by the arrow x.

Assuming now that signals obtained from these areas are respectively represented by A1 to A4, B1 to B4, C1 to C4, D1 to D4 and E1 to E4 in the clockwise direction, for example, of the light-receiving areas shown in FIGS. 3 and 4, then since difference signals (that is, difference signals of the radial direction) of the areas divided along the direction in which the tracks are arrayed, that is, of the areas divided by the dividing line along the track extending direction are the offsets of the objective lens, the tracking error signal TES may be expressed as:

$$TES = PPA - \{k1 \times (PPC+PPE) - k2 \times (PPA+PPD)\} \quad (3)$$

$$PPA = (A1+A4) - (A2+A3) \quad (4)$$

$$PPB = (B1+B4) - (B2+B3) \quad (5)$$

$$PPC = (C1+C4) - (C2+C3) \quad (6)$$

$$PPD = (D1+D4) - (D2+D3) \quad (7)$$

$$PPE = (E1+E4) - (E2+E3) \quad (8)$$

It should be noted that k1 and k2 are arbitrary constants and that they are correction coefficients which can correct differences produced by different intensity distributions of incident light and different diffracted light amounts of diffraction elements.

It is possible to obtain the tracking error signal TES by executing these calculations in the arithmetic circuit 15 shown in FIG. 1.

Figure 5A:
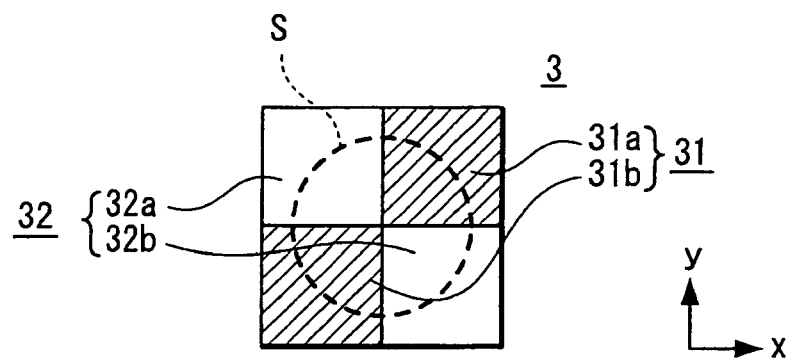
FIG. 5A is a schematic plan view showing an arrangement of an embodiment of a diffraction element for use with the optical pickup and the optical recording and reproducing apparatus according to the present invention.

The shape of the diffraction area of the diffraction element is not limited to the above-mentioned one described with reference to FIG. 2A and it is possible to use the diffraction element 3 which is divided into four diffraction areas in the direction in which the tracks are arrayed and the track extending direction substantially perpendicular to the aforementioned direction in which the tracks are arrayed as shown in FIG. 5A, for example.

In this case, the first diffraction area 31 is composed of four divided areas, that is, areas 31a and 31b opposing to each other on the diagonal line and the second diffraction area 32 is composed of areas 32a and 32b similarly opposing to each other on the diagonal line.

Figure 5B:
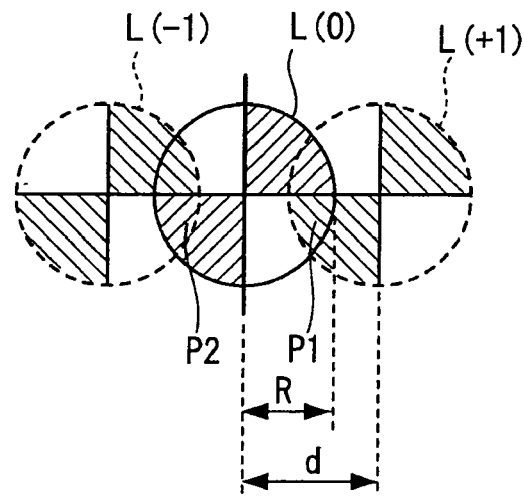
FIG. 5B is a diagram to which reference will be made in explaining shapes of light beams in the light-receiving unit of the embodiment of the diffraction element for use with the optical pickup and the optical recording and reproducing apparatus according to the present invention.

When the above-mentioned diffraction element 3 is in use, as shown in FIG. 5B, 0-th order light L(0) and ±first-order lights L(+1) diffracted in the guide grooves of the optical recording medium 10 are received by the light-receiving unit 9 in the state in which they may not overlap with each other. In FIG. 5B, the areas to receive light diffracted from the first diffracted area are shown hatched. In FIGS. 5A and 5B, elements and parts identical to those of FIGS. 2A and 2B are denoted by identical reference numerals and therefore need not be described.

FIG. 6 is a schematic plan view showing an arrangement of an example of the light-receiving unit to receive the thus divided diffracted lights. In FIG. 6, elements and parts identical to those of FIG. 3 are denoted by identical reference numerals and therefore need not be described. Also in this case, if the respective light-receiving elements 90, 91a and 91b, 92a and 92b are divided into four divided portions along the track extending direction (shown by the arrow y) and the track array direction (shown by the arrow x), then it is possible to obtain a tracking error signal in which the offset of the objective lens was corrected by using the above-described equations (3) to (8).

Figure 7:
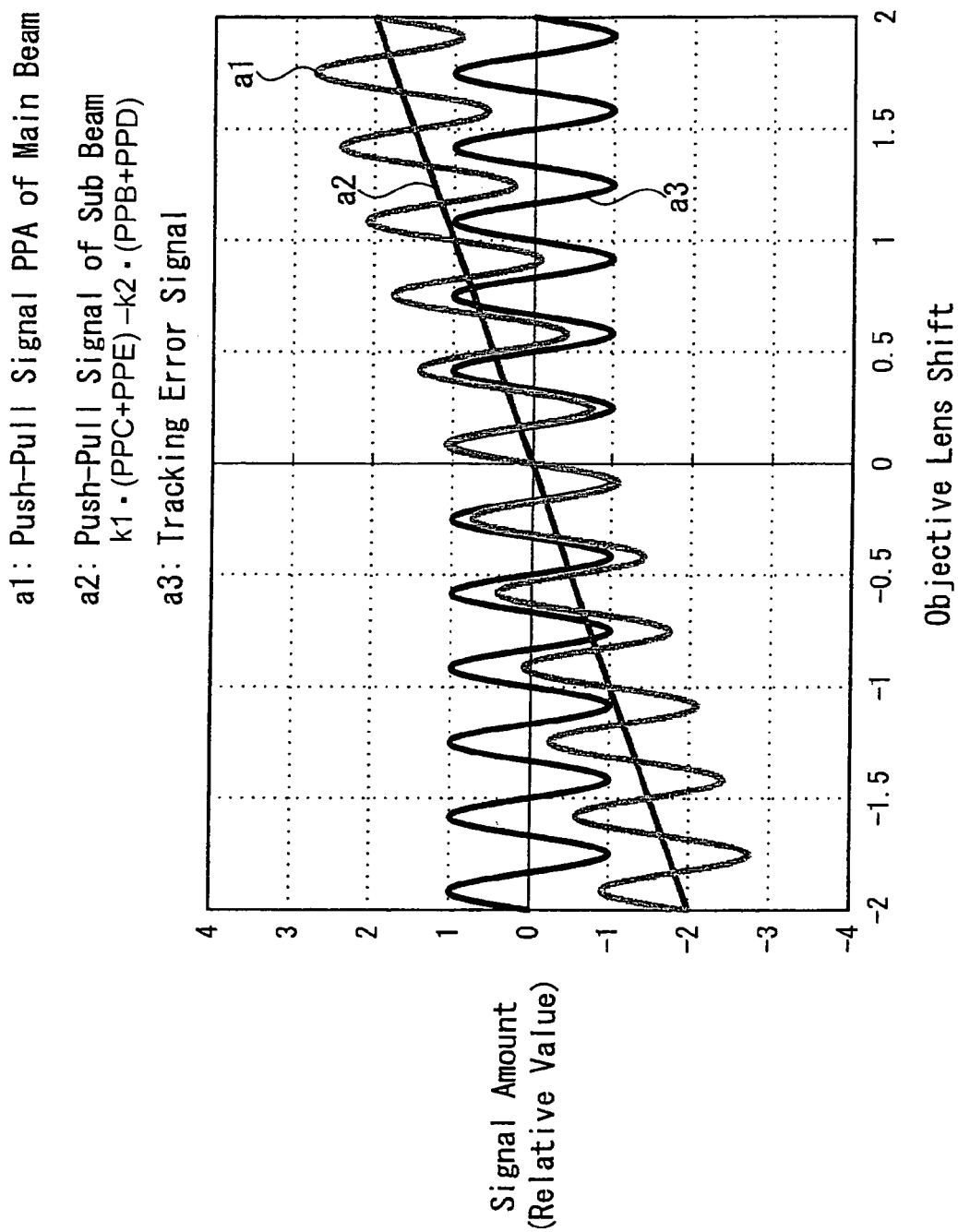
FIG. 7 is a diagram showing a tracking error signal relative to lens shift of an objective lens according to a tracking error signal detecting method of the present invention.

According to this calculation, as shown in FIG. 7, a DC component shown by a solid line a2 added to the tracking error signal PPA of the main beam shown by a solid line a1 from the offset of the objective lens, that is, the push-pull component of the sub-beams can be corrected and hence it is possible to detect only the inherent tracking error signal component TES shown by a solid line a3.

FIG. 8 is a block diagram showing an embodiment of an arithmetic circuit for computing the above-described equations (3) to (8).

Light amounts A1 to A4, B1 to B4, . . . E1 to E4 detected at the first to fifth light-receiving elements of, for example, the light-receiving unit 9 are respectively converted into voltage-converted detected signals by current-to-voltage converting amplifiers (not shown). Then, sum signals of the light-receiving areas divided along the track extending direction shown by the arrow γ, that is, A1+A4, A2+A3, B1+B4, B2+B3, C1+C4, C2+C3, D1+D4, D2+D3, E1+E4 and E2+E3 are calculated by adders 41 to 50. Also, (A1+A4)−(A2+A3), that is, PPA, (D1+D4)−(D2+D3), that is, PPD and further (E1+E4)−(E2+E3), that is, PPE are calculated by subtracters 51 to 55, respectively. Further, PPC+PPE and PPB+PPD are added by adders 56 and 57, added results are respectively multiplied with the coefficients k1 and k2 by multipliers k1 and k2 and k1×(PPC+PPE) and k2×(PPB+PPD) are respectively subtracted from the push-pull signal by subtracters 58 and 59, thereby resulting in being outputted as the tracking error signal TES.

Figure 9C:
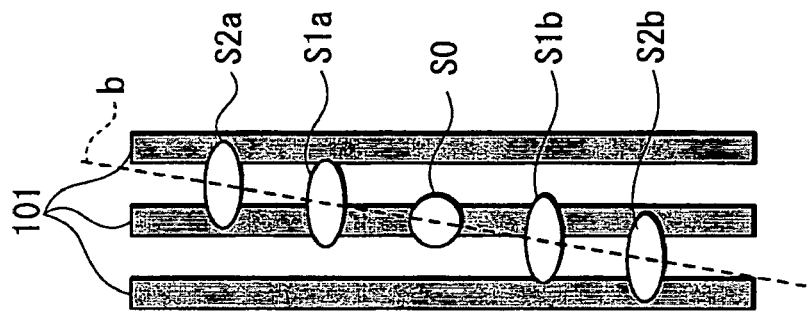
FIGS. 9B and 9C are schematic plan views showing the state in which light beams are irradiated on the tracks of the optical recording medium in the optical pickup according to the present invention.
Figure 9B:
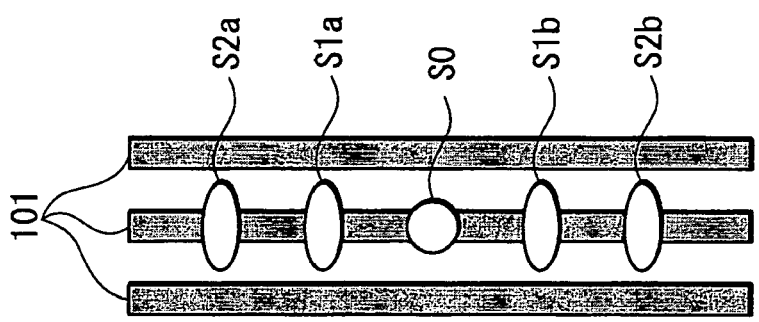
Figure 9A:
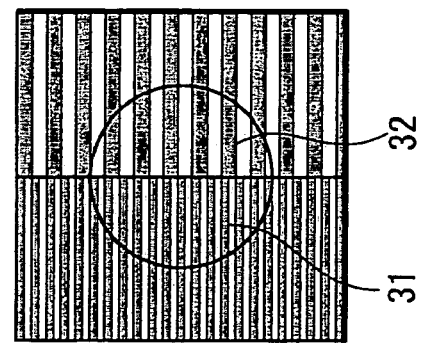
FIG. 9A is a schematic plan view showing an arrangement of an embodiment of a diffraction element for use with the optical pickup according to the present invention.

FIG. 9A is a schematic plan view showing an arrangement of an embodiment of the aforementioned diffraction element shown in FIG. 2A. FIGS. 93 and 9C are respectively schematic plan views showing arrangements of shapes of respective light beams formed on the track of the optical recording medium when the light-receiving element 9 is located as shown in FIG. 3.

According to the present invention, respective ±first-order diffracted lights, that is, beam spots 51a and 51b and S2a and S2b shown in FIGS. 9B and 9C can be focused on recording tracks 101 of the optical recording medium 10 with arbitrary spaces and in the arbitrary directions relative to a beam spot So of 0-th order diffracted light. Further, it is possible that the ±first-order diffracted lights from the first and second diffraction areas 31 and 32 may be arrayed on the track 101 as shown in FIG. 9B. Also, as shown by a broken line b in FIG. 9C, they may be arrayed on the direction slanting with an arbitrary angle of inclination relative to the track extending direction in which the track 101 is extended. That is, it is sufficient that they may be separated on the optical recording medium 10.

Figure 10A:
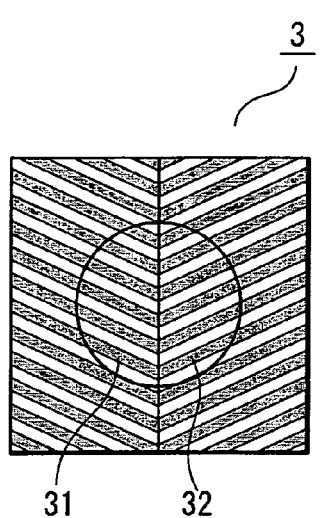
FIG. 10A is a schematic plan view showing an arrangement of an embodiment of a diffraction element for use with an optical pickup according to the present invention.
Figure 10B:
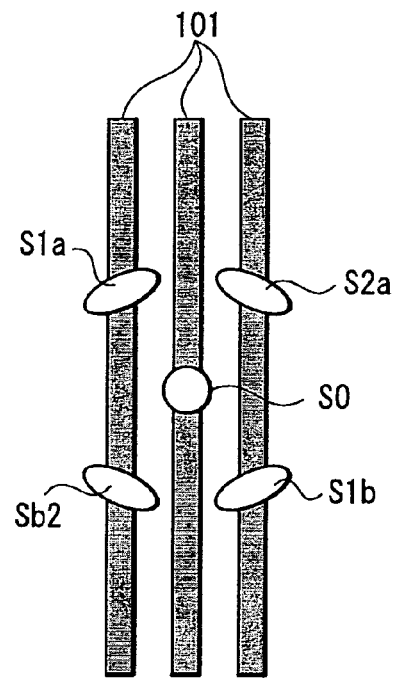
FIG. 10B is a schematic plan view showing the state in which light beams are irradiated on the tracks of the optical recording medium in the optical pickup according to the present invention.

Also, FIG. 10A is a schematic plan view showing an arrangement of an embodiment of the aforementioned diffraction element that has been described so far with reference to FIG. 2A. FIG. 10B is a schematic plan view showing arrangements of respective examples of shapes of respective light beams formed on the tracks of the optical recording medium 10 when the light-receiving unit 9 is located as shown in FIG. 4.

Figure 11A:
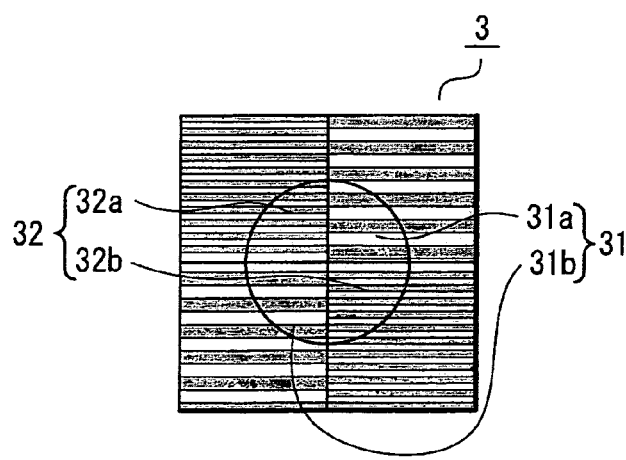
FIG. 11A is a schematic plan view showing an arrangement of an embodiment of a diffraction element for use with an optical pickup according to the present invention.
Figure 11B:
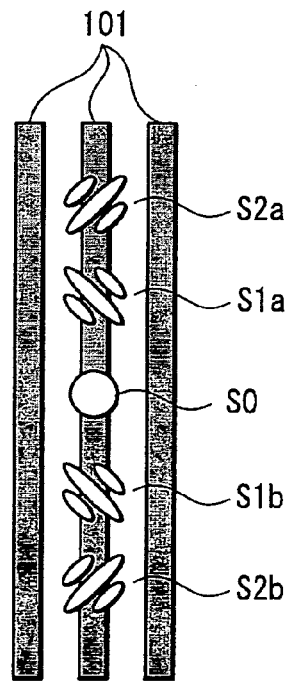
FIG. 11B is a schematic plan view showing the state in which light beams are irradiated on the tracks of the optical recording medium in the optical pickup according to the present invention.

Further, FIG. 11A is a schematic plan view showing an arrangement of an embodiment of the aforementioned diffraction element that has been described so far with reference to FIG. 5A. FIG. 11B is a schematic plan view similarly showing arrangements of shapes of respective light beams formed on the tracks of the optical recording medium 10 when the light-receiving unit 9 is located as shown in FIG. 6. In FIGS. 10A and 10B and FIGS. 11A and 11B, elements and parts identical to those of FIGS. 9A to 9C are denoted by identical reference numerals and therefore need not be described.

As shown in FIGS. 9A, 9B, 9C, FIGS. 10A, 10B and FIGS. 11A and 11B, while at least five light beams are formed by the diffraction element and irradiated on the optical recording medium according to the present invention, when light beams are located on the tracks, the light beams need not be located on the tracks with high accuracy. Also, 0-th order light need not be located on the seek axis of the optical pickup with high accuracy.

According to the above-described tracking error signal detecting method, optical pickup and optical recording and reproducing apparatus of the present invention, by generating sub-beams having no push-pull component, it is possible to satisfactorily obtain the tracking error signal in which offset is not produced against the offset of the objective lens. Also, according to the thus achieved effects, the following effect also can be achieved:

(A) The positions of sub-beams need not be held with high accuracy relative to the guide grooves of the optical recording medium;

(B) The objective lens can be located at any other position than the seek axis of the optical pickup relative to the optical recording medium;

(C) The distance from the main beam to the sub-beams can be set arbitrarily. That is, optical magnification of the returned light optical system can be set arbitrarily and a sufficiently large space can be produced between the light-receiving elements in the light-receiving unit. Hence, it is possible to improve signal reproducing characteristics; and (D) It is possible to detect the focus error signal with compatibility with optical recording mediums having different track pitches.

Next, a method for detecting a focus error signal by using diffraction elements for use with an optical pickup and an optical recording and reproducing apparatus having arrangements according to the present invention will be described.

Since the related-art astigmatism method for detecting a focus error signal is simple in pattern of a detecting unit, it is able to detect focus error with high accuracy and it is also well compatible with other detecting signals, it is generally used widely. However, the related-art astigmatism method encounters with a problem in which offset occurs between guide grooves of an optical recording medium, so-called grooves and lands between these grooves. It is necessary to remove this offset particularly in an optical recording medium in which a phase depth between the groove and the land is approximately ⅛ of a wavelength of recording and/or reproducing light irradiated on the optical recording medium.

As described above, since the optical pickup and the optical recording and reproducing apparatus according to the present invention is able to obtain a signal without a modulated component produced by this groove, if focus errors are detected from respective beams based on the astigmatism method and detected focus errors are added, then it is possible to obtain a focus error signal in which no offset is produced between the groove and the land.

Figure 12:
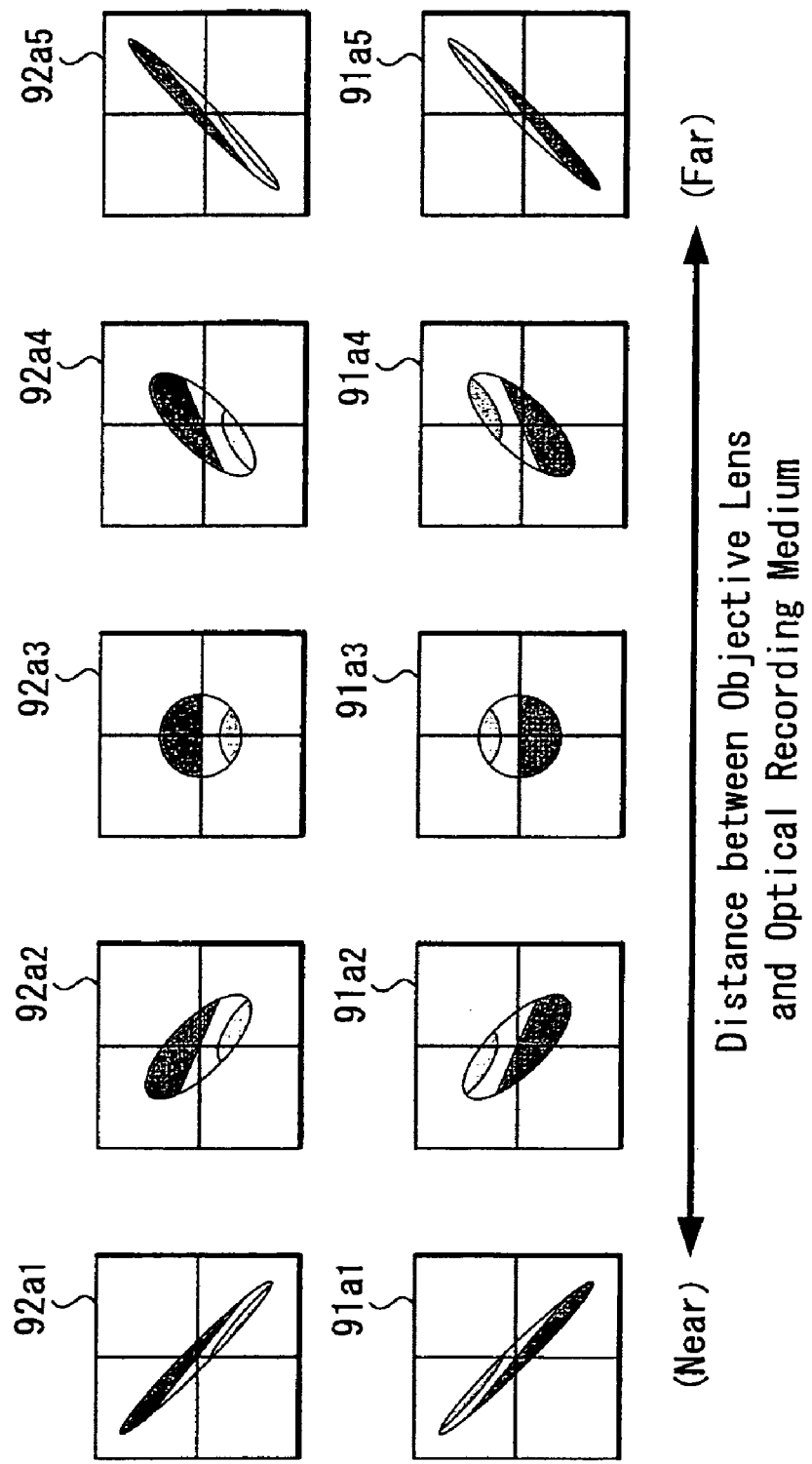
FIG. 12 is a schematic plan view showing the manner in which shapes of beam spots are changed relative to distances between the objective lens and the optical recording medium in an embodiment of a light-receiving unit of an optical pickup according to the present invention.

By way of example, FIG. 12 is a schematic plan view showing arrangements of shapes of spots of beams received at the light-receiving unit from the optical pickup having the above-mentioned arrangement. In this example, FIG. 12 shows the changes of shapes of respective beam spots of light beams generated at the light-receiving unit due to a difference of distances between the objective lens and the optical recording medium when the diffraction element 3 halved in the direction in which the tracks are arrayed, that is, the diffraction element 3 halved by the dividing line extended along the track extending direction is used as has been explained with reference to FIG. 2A and in which the light-receiving unit having the arrangement shown in FIG. 3 is used as the light-receiving unit. In FIG. 12, reference numerals 91a1 to 91a5 and 92a1 to 92a5 show the cases in which the distance between the optical recording medium and the objective lens is being changed from the short distance to the long distance in both of the light-receiving elements 91a and 92a which receive + first-order diffracted light from the first and second diffraction areas 31 and 32 of the diffraction element 3 shown in FIG. 2A. It is to be understood that, when the distance between the optical recording medium and the objective lens is proper, as shown by the light-receiving elements 91a3 and 92a3, shapes of beam spots are substantially perfect circles. Also, it is to be understood that, when the above-mentioned distance is shorter or longer, the shapes of the beam spots are extended on the diagonal lines of the quadrant light-receiving areas of the light-receiving elements 91a and 92a. Accordingly, if a sum of the signals of the light-receiving areas of this diagonal line is calculated and a difference therebetween is calculated, then it is possible to detect a focus error signal.

Figure 13:
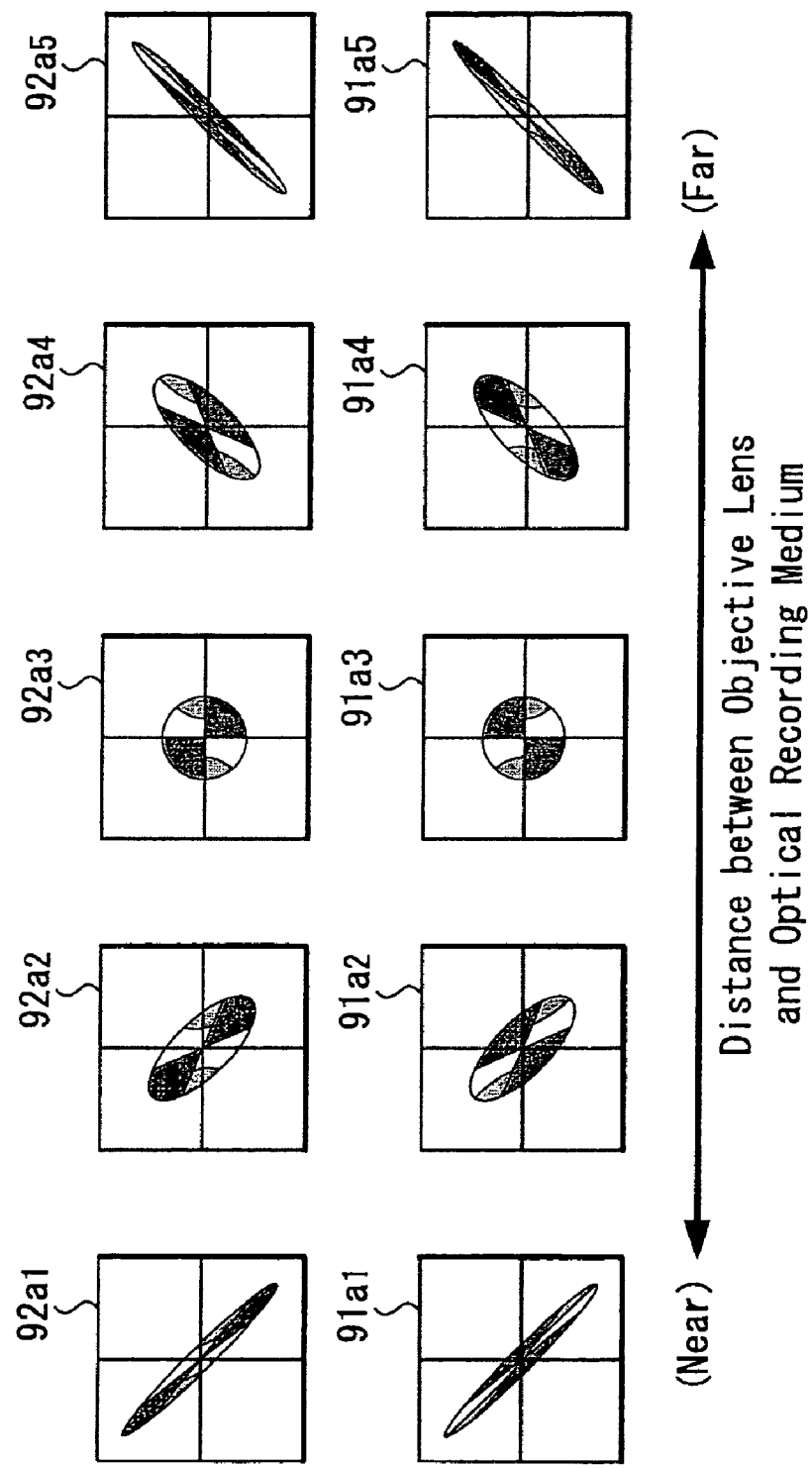
FIG. 13 is a schematic plan view showing the manner in which shapes of beam spots are changed relative to distances between the objective lens and the optical recording medium in an embodiment of a light-receiving unit of an optical pickup according to the present invention.

FIG. 13 shows the changes of shapes of respective beam spots of light beams generated at the light-receiving unit due to a difference of distances between the objective lens and the optical recording medium when the diffraction element 3 divided by four along the direction in which the tracks of the optical recording medium are arrayed and in the track extending direction perpendicular to the above-mentioned direction and which has first and second diffraction areas on the diagonal line is used and in which the aforementioned light-receiving unit described with reference to FIG. 6 is used as a light-receiving unit. In FIG. 13, elements and parts identical to those of FIG. 12 are denoted by identical reference numerals and therefore need not be described.

Also in this case, if a sum of signals at the light receiving units on the diagonal lines of the respective light-receiving elements 91 and 92 is calculated and a difference therebetween is calculated, then it is possible to detect a focus error signal.

More specifically, the focus error signal EFS can be obtained as follows:

$$EFS=FEB+FEC+FED+FEE \quad (9)$$

$$FEB=(B1+B3)-(B2+B4) \quad (10)$$

$$FEC=(C1+C3)-(C2+C4) \quad (11)$$

$$FED=(D1+D3)-(D2+D4) \quad (12)$$

$$FEE=(E1+E3)-(E2+E4) \quad (13)$$

Figure 14:
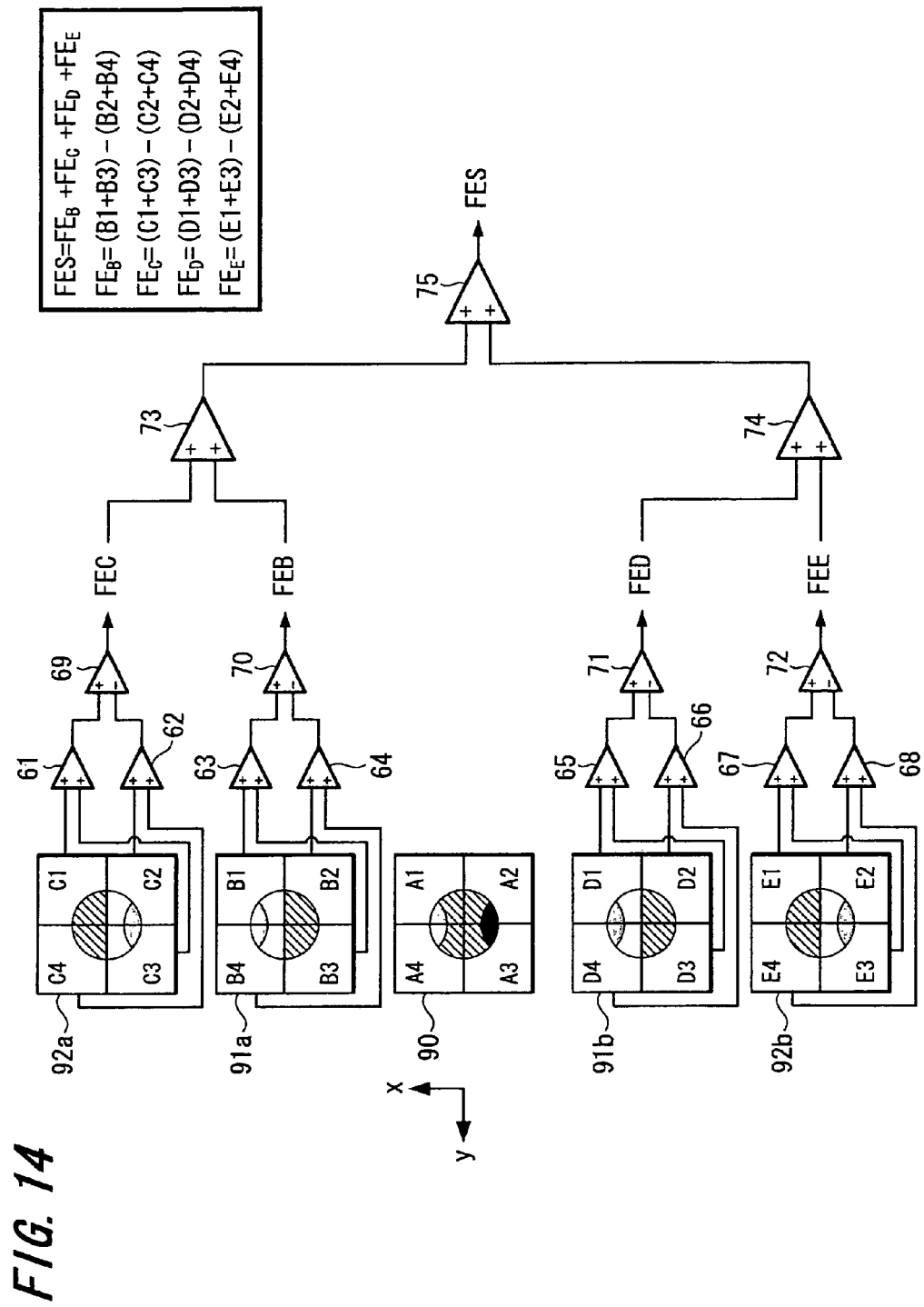
FIG. 14 is a schematic block diagram showing an embodiment of an arithmetic circuit of an optical recording and reproducing apparatus according to the present invention.

FIG. 14 is a block diagram showing an embodiment of an arithmetic circuit for computing the above-described equations (9) to (13).

Light amounts B1 to B4, C1 to C4, D1 to D4, E1 to E4 detected at the second to fifth light-receiving elements of, for example, the light-receiving unit 9 are respectively converted into voltage-converted detected signals by current-to-voltage converting amplifiers (not shown). Then, sum signals of the areas opposing to each other on the diagonal lines of the light-receiving areas divided along the track array direction and the track extending direction perpendicular to the above-mentioned track array direction as shown by the arrows x and y, that is, B1+B3, B2+B4, C1+C3, C2+C4, D1+D3, D2+D4, E1+E3 and E2+E4 are calculated by adders 61 to 68. Also, (B1+B3)−(B2+B4), that is, FEB, (C1+C3)−(C2+C4), that is, FEC and (D1+D3)−(D2+D4), that is, FED and further (E1+E3)−(E2+E4), that is, FEE are calculated by subtracters 69 to 72, respectively. Then, further, FEB+FEC+FED+FEE are added by adders 73, 74 and 75 and thereby outputted as the focus error signal FES.

FIGS. 15A, 15B, FIGS. 16A, 16B, FIGS. 17A, 17B and FIGS. 18A, 18B show analyzed results of signal outputs obtained when the phase depth between the groove (guide groove) and the land of the optical recording medium is λ/8 (λ represents the wavelength of the recording and/or reproducing light) in the above-mentioned optical pickup and optical recording and reproducing apparatus.

Figure 15A:
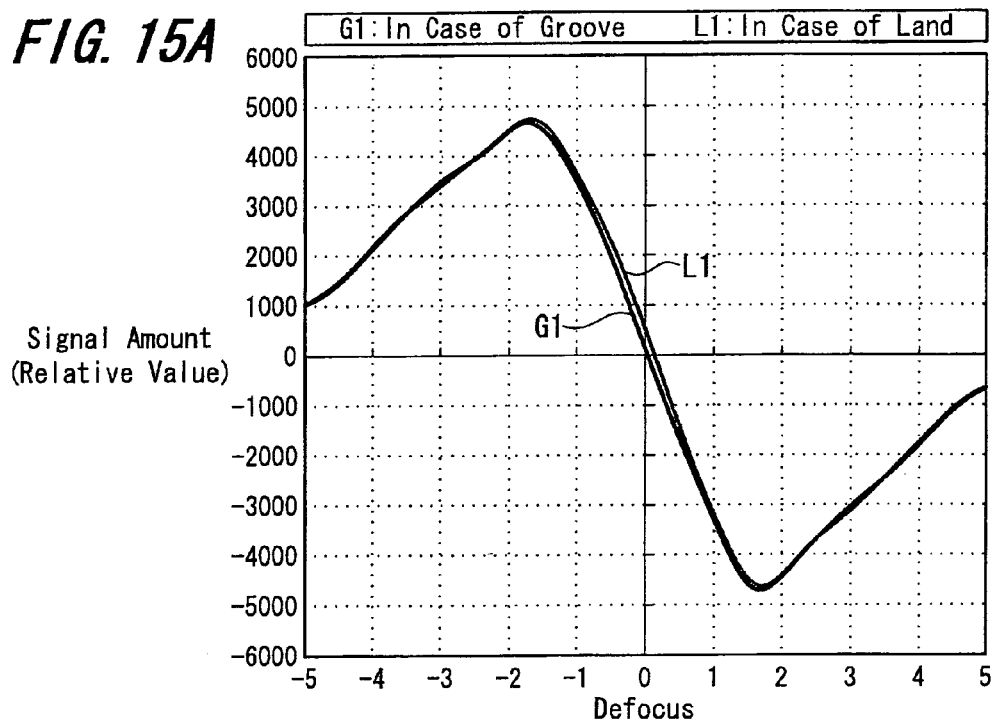
FIGS. 15A and 15B are diagrams showing examples of focus error signals obtained by an ordinary astigmatism method, respectively.
Figure 15B:
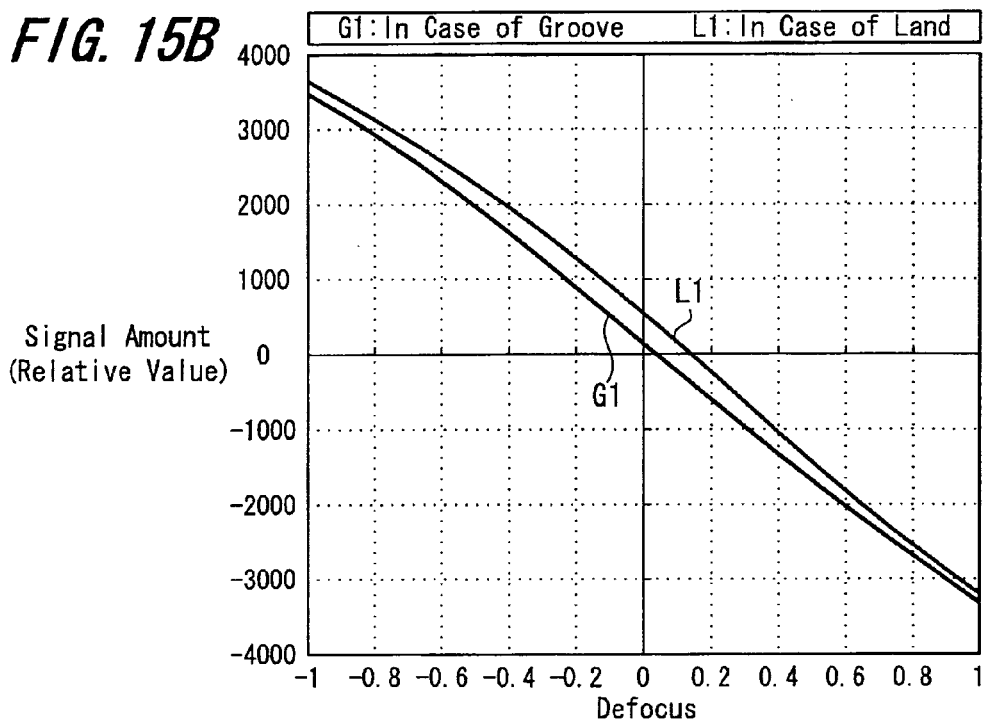

FIGS. 15A and 15B show examples of analyzed results obtained when the focus error signal was simulated based on the ordinary astigmatism method. FIG. 15B shows the results obtained when the defocusing degree in FIG. 15A was shown in an enlarged-scale.

From FIGS. 15A and 15B, it is to be understood that offsets are produced in case of the land and in case of the groove as shown by solid lines G1 and L1.

Figure 16A:
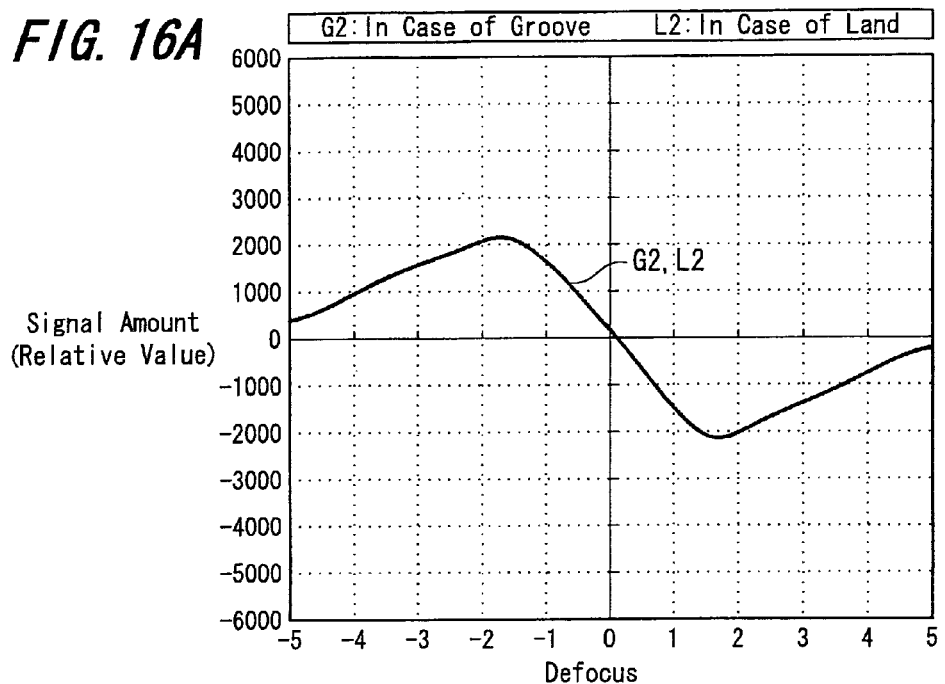
FIGS. 16A and 16B are diagrams showing examples of focus error signals obtained in a first diffraction area of a diffraction element for use with an optical pickup according to the present invention, respectively.
Figure 16B:
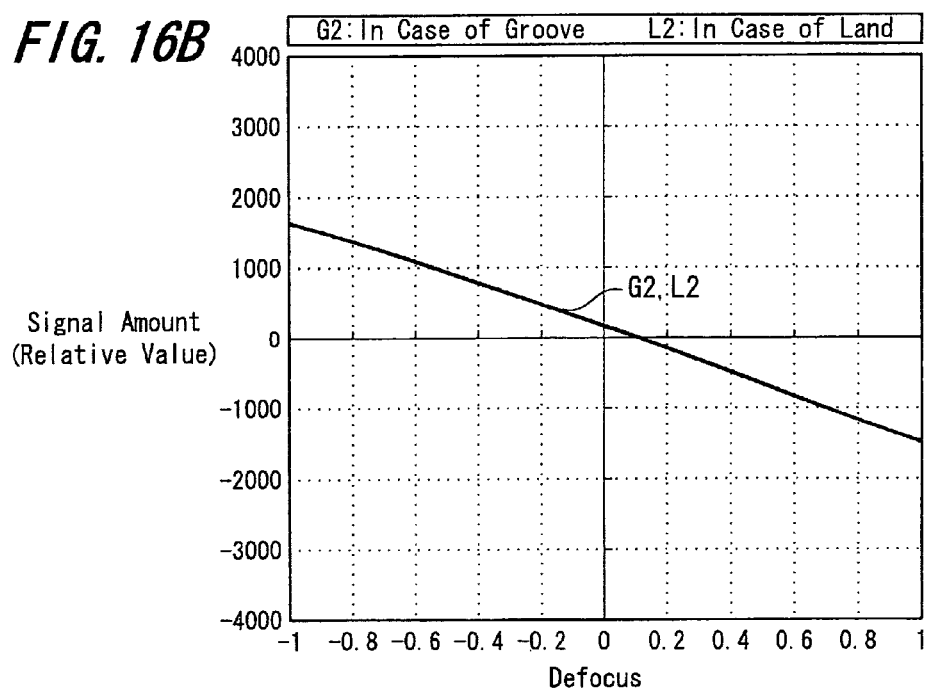
Figure 17A:
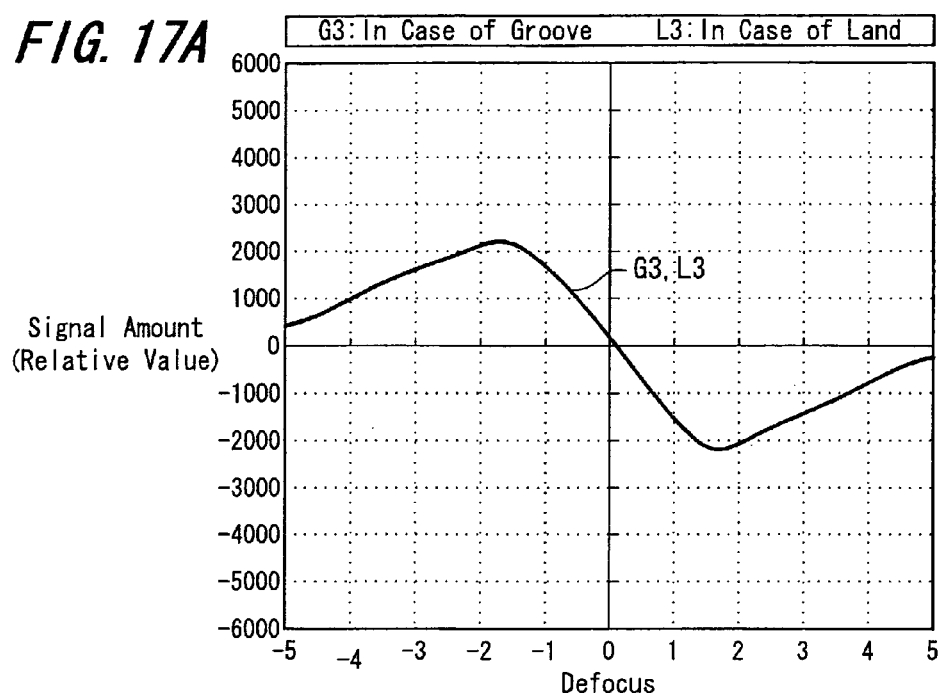
FIGS. 17A and 17B are diagrams showing examples of focus error signals obtained in a second diffraction area of a diffraction element for use with an optical pickup according to the present invention, respectively.
Figure 17B:
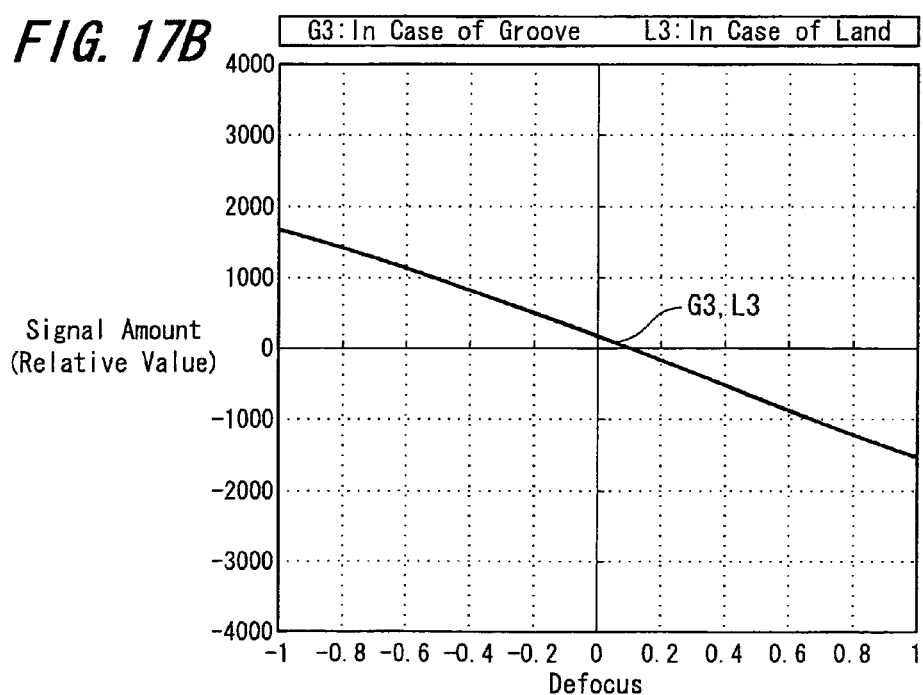
Figure 18A:
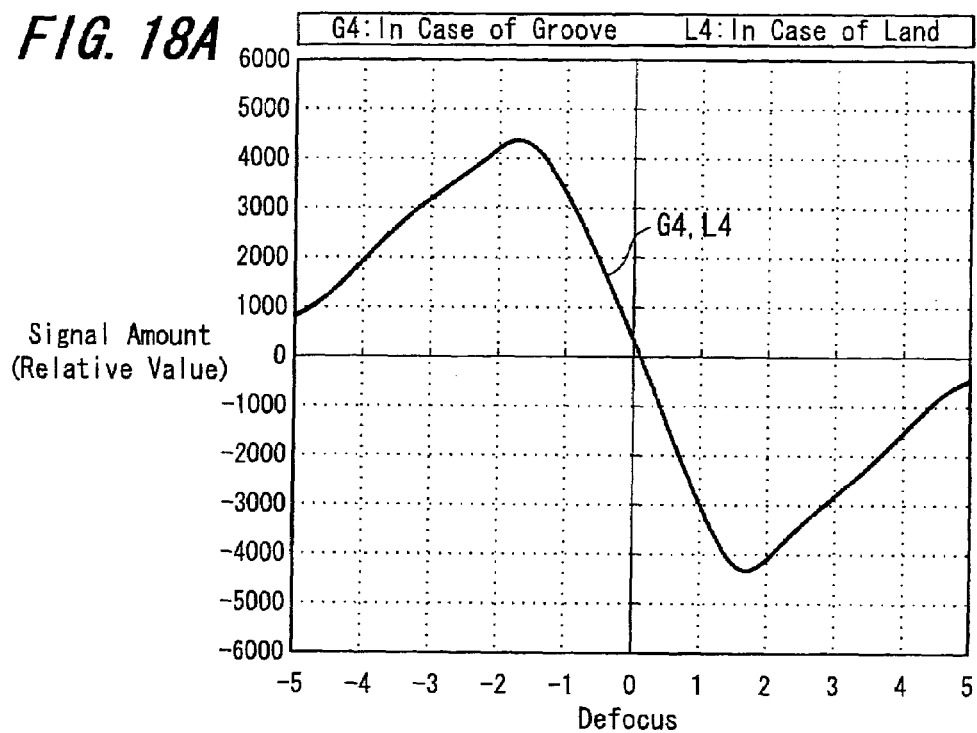
FIGS. 18A and 18B are diagrams showing examples of sums of focus error signals obtained in the first and second diffraction areas of a diffraction element for use with the optical pickup according to the present invention, respectively.
Figure 18B:
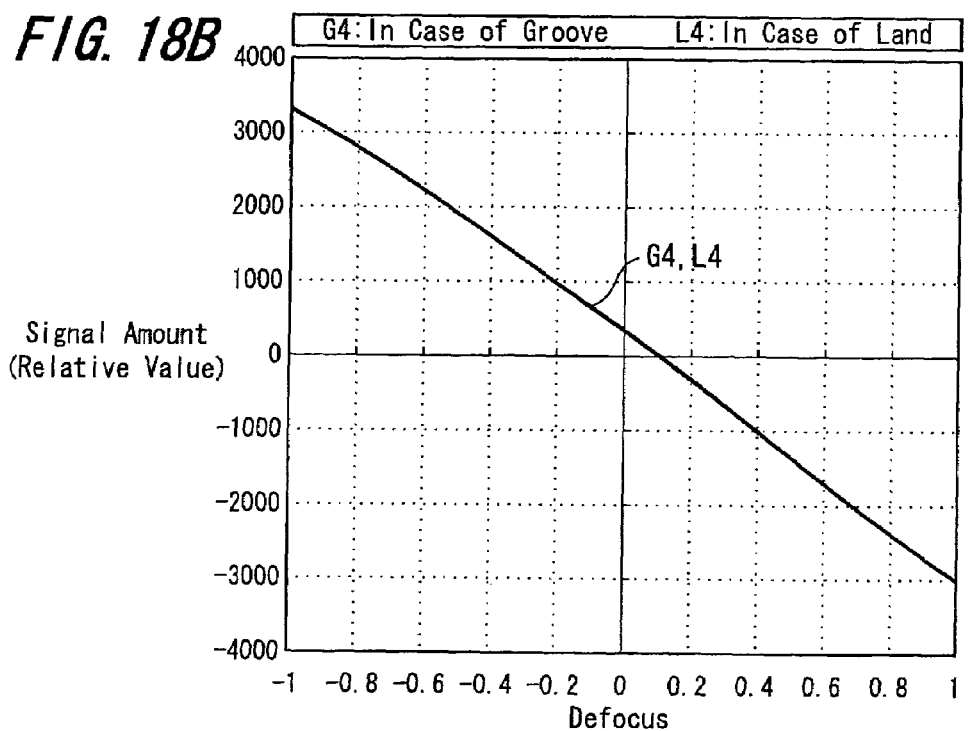

On the other hand, FIGS. 16A, 16B, FIGS. 17A, 17B and FIGS. 18A and 18B show sums of focus error signals obtained from the first areas of the aforementioned diffraction elements based on the astigmatism method, focus error signals obtained from the second areas based on the astigmatism method and focus error signals obtained from the first and second areas based on the astigmatism method, respectively. Also, FIGS. 16B, 17B and 18B show results obtained when defocusing degrees in FIGS. 16A, 17A and 18A are shown in an enlarged-scale, respectively.

From the results shown in FIGS. 16A, 16B to FIGS. 18A, 18B, it is clear that the focus error signals obtained from the first and second areas do not generate offset in case of the groove and the land and that the focus error signals are in agreement with each other as shown by solid lines G2 to G4 and L2 to L4.

More specifically, a study of the results shown in FIGS. 16A, 16B to FIGS. 18A, 18B may reveal that the focus error signal in which no offset is generated between the groove and the land can be obtained.

As set forth above, according to the optical pickup and the optical recording and reproducing apparatus of the present invention, the diffraction element is provided between the light source and the optical recording medium and this diffraction element includes at least the first and second diffraction areas as described above so that ±first-order diffracted lights diffracted by the respective areas are divided such that ±first-order diffracted lights diffracted by the guide grooves of the optical recording medium and 0-th order light may not overlap with each other. Therefore, it is to be understood that it is possible to obtain the tracking error signal in which the offset of the objective lens was corrected and that the focus error signal in which the offset can be prevented from being generated between the groove and the land can be obtained.

It should be noted that the diffraction area of the diffraction element is not limited to the case in which the diffraction area is halved to provide two diffraction areas along the aforementioned direction in which the tracks are arrayed or the case in which the diffraction area is divided by four to provide four diffraction areas along the direction in which the tracks are arrayed and along the direction in which the track is extended.

Figure 19:
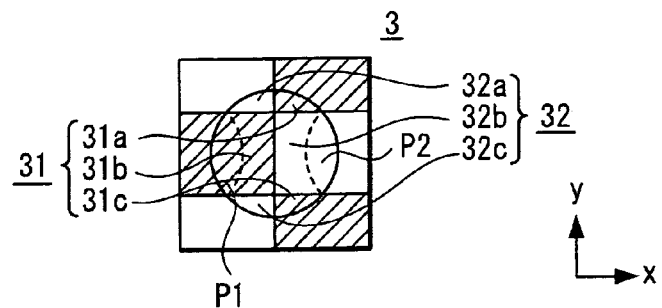
FIG. 19 is a schematic plan view showing an arrangement of an embodiment of a diffraction element for use with an optical pickup according to the present invention.

For example, FIG. 19 is a schematic plan view showing an arrangement of an example of a diffraction element. As shown in FIG. 19, the diffraction area may be halved along the track extending direction shown by an arrow y and also the diffraction area may be divided by three along the track array direction substantially perpendicular to the track extending direction as shown by an arrow x. Thus, it is possible to provide six divided diffraction areas in total.

In this case, as shown hatched in FIG. 19, the areas 31a, 31b and 31c on the diagonal lines of the respective divided lines may be provided as the first diffraction area 31 and the areas 32a, 32b and 32c on the diagonal lines of the opposite direction may be provided as the second diffraction area 32. As shown by a broken line in FIG. 19, it is to be understood that areas which serve as push-pull modulated components, that is, areas P1 and P2 in which the ±first-order diffracted lights diffracted based on the guide grooves and the 0-th order light may overlap with each other are divided by the two diffraction areas 31 and 32.

Figure 20:
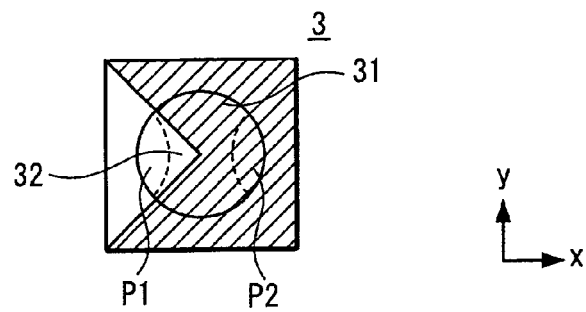
FIG. 20 is a schematic plan view showing an arrangement of an embodiment of a diffraction element for use with an optical pickup according to the present invention.

Also, as shown in FIG. 20, the diffraction element 3 can be divided in such a manner that first and second diffraction areas 31 and 32 may be provided by a V-like dividing line made horizontal relative to the track extending direction, for example, and that the area P2 in which the ±first-order diffracted lights diffracted based on the above-mentioned guide grooves may be contained in the first diffraction area 31 and the area P1 may be contained in the second diffraction area 32.

Figure 21:
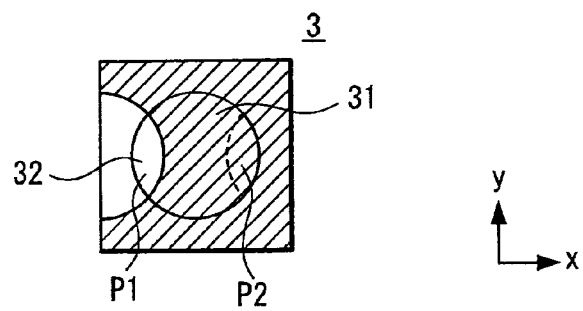
FIG. 21 is a schematic plan view showing an arrangement of an embodiment of a diffraction element for use with an optical pickup according to the present invention.

Further, as shown in FIG. 21, the same area as this area may be used as the second diffraction area 32 and the remaining area may be used as the first diffraction area 31.

Figure 22:
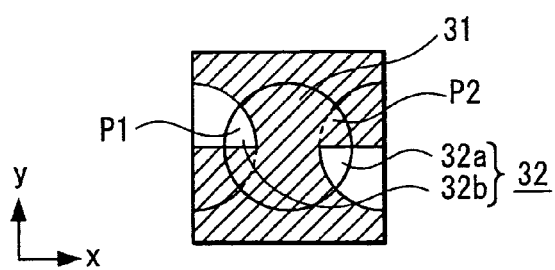
FIG. 22 is a schematic plan view showing an arrangement of an embodiment of a diffraction element for use with an optical pickup according to the present invention.

Furthermore, as shown in FIG. 22, the first diffraction area 31 may contain the half areas provided by halving the areas P1 and P2 along the direction shown by an arrow x and the remaining areas may be used as the second diffraction area 32.

More specifically, the first and second diffraction areas 31 and 32 may be divided in such a manner that the areas P1 and P2 in the respective diffraction areas may not overlap with each other when the areas P1 and P2 are shifted in the horizontal direction (direction in which the tracks are arrayed as shown by an arrow x), As set forth above, according to the present invention, it is possible to easily obtain the tracking error signal in which the offset of the objective lens was corrected by irradiating a plurality of beams on the tracks of the optical recording medium. At the same time, a plurality of beams need not be located on the tracks with high accuracy. Also, since light need not be located on the seek axis of the optical pickup with high accuracy, there are then advantages that the assembly process of the optical pickup can be simplified and that the present invention can become able to cope with optical recording mediums with different track pitches.

Also, since a space in which beams are located can be selected properly, a space between the light-receiving elements in the light-receiving unit can be increased as compared with the related art. Hence, freedom in design can be increased. Also, sensitivity of the light-receiving element can be avoided from being lowered and it is possible to suppress or avoid recording and reproducing characteristics from being lowered.

Further, it is possible to configure an optical pickup and an optical recording and reproducing apparatus compatible with optical recording mediums with different track pitches.

Furthermore, it is possible to provide the optical pickup and the optical recording and reproducing apparatus which can obtain the focus error signal, which does not cause the offset between the groove and the land of the optical recording medium, by using the diffraction element in the optical pickup and the optical recording and reproducing apparatus according to the present invention and which can satisfactorily carry out focusing servo and tracking servo.

It should be noted that the tracking error signal detecting method, the optical pickup and the optical recording and reproducing apparatus according to the present invention are not limited to those of the above-described embodiments. For example, the diffraction gratings having the above-mentioned arrangements may be used as the diffraction elements and that diffraction gratings of various shapes can be used as the diffraction elements without departing from the arrangements of the present invention.

Also, when a magneto-optical recording medium is used as a target optical recording medium, it is needless to say that the optical pickup and the optical recording and reproducing apparatus according to the present invention can be variously modified and varied in such a manner as to provide a magnetic applying device in the optical pickup shown in FIG. 1.

Furthermore, the tracking error signal detecting method, the optical pickup and the optical recording and reproducing apparatus according to the present invention can be applied to optical recording mediums of various recording and reproducing types such as a read-only type optical recording medium, a write once type optical recording medium and a recordable type optical recording medium. More specifically, the present invention is not limited to a recording and reproducing method based on concave and convex pits and the present invention can be applied to any of recording and reproducing methods in the optical recording and reproducing apparatus such as a dye-based optical recording and reproducing method, a phase-change type optical recording and reproducing method and a magneto-optical recording method.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
an optical system in which light from a light source is introduced through an objective lens into an optical recording medium and in which light reflected from said optical recording medium is introduced into a light-receiving unit; and
an objective lens driving unit for driving said objective lens based on a light output detected at said light-receiving unit,
wherein a diffraction element is provided between said light source and said objective lens, and
wherein said diffraction element is provided with at least first and second diffraction areas and said first and second diffraction areas have such grating shapes that ± first-order diffracted lights diffracted are received by said light-receiving unit at the position in which 0-th order light and ± first-order diffracted lights diffracted by guide grooves of said optical recording medium do not overlap with each other,
wherein said diffraction element has said first and second diffraction areas in which an area in which ± first-order diffracted lights diffracted by said guide grooves and 0-th order light are offset from each other by a space expressed as:

$d=\{\lambda/(p\times NA)\}\times R$, where $\lambda$ represents the wavelength of light emitted from said light source, NA represents the numerical aperture of said objective lens, R represents the pupil radius, and p represents the track pitch of said optical recording medium.

2. The optical pickup according to claim 1, wherein said diffraction element has different pitches of diffraction gratings provided in said first and second diffraction areas.

3. The optical pickup according to claim 1, wherein said diffraction element has different diffraction directions of diffraction gratings provided in said first and second diffraction areas.

4. The optical pickup according to claim 1, wherein said first and second diffraction areas of said diffraction element are areas halved along the direction in which tracks are arrayed in said optical recording medium.

5. The optical pickup according to claim 1, wherein said first and second diffraction areas of said diffraction element are areas on a diagonal line of areas divided by four along the direction in which tracks are arrayed and along the direction in which a track is extended in said optical recording medium.

6. The optical pickup according to claim 1, wherein said light-receiving unit is composed of first to fifth light-receiving elements, said first to fifth light-receiving elements are located in the direction corresponding to the direction in which ± first-order diffracted lights are diffracted by said first and second diffraction areas of said diffraction element and said first to fifth light-receiving elements are respectively divided by four along the direction in which the tracks of said optical recording medium are arrayed and along the direction in which the track is extended.

7. An optical recording and reproducing apparatus comprising:
an optical pickup including an optical system in which light from a light source is introduced at least through an objective lens into an optical recording medium, light reflected from said optical recording medium being introduced into a light-receiving unit and an objective lens driving unit for driving said objective lens and which carries out recording and/or reproduction based on a light output detected at said light-receiving unit, wherein a diffraction element is provided between said light source and said objective lens, wherein said diffraction element is provided with at least first and second diffraction areas and said first and second diffraction areas have such grating shapes that ± first-order diffracted lights diffracted are received by said light-receiving unit at the position in which 0-th order light and ± first-order diffracted lights diffracted by guide grooves of said optical recording medium do not overlap with each other wherein said diffraction element has said first and second diffraction areas in which an area in which ± first-order diffracted lights diffracted by said guide grooves and 0-th order light are offset from each other by a space expressed as:

$d=\{\lambda/(p\times NA)\}\times R,$ where λ represents the wavelength of light emitted from said light source, NA represents the numerical aperture of said objective lens, R represents the pupil radius and p represents the track pitch of said optical recording medium.

8. The optical recording and reproducing apparatus according to claim 7, wherein said diffraction element has different pitches of diffraction gratings provided in said first and second diffraction areas.

9. The optical recording and reproducing apparatus according to claim 7, wherein said diffraction element has different diffraction directions of diffraction gratings provided in said first and second diffraction areas.

10. The optical recording and reproducing apparatus according to claim 7, wherein said first and second diffraction areas of said diffraction element are areas halved along the direction in which tracks are arrayed in said optical recording medium.

11. The optical recording and reproducing apparatus according to claim 7, wherein said first and second diffraction areas of said diffraction element are areas on a diagonal line of areas divided by four along the direction in which tracks are arrayed and along the direction in which a track is extended in said optical recording medium.

12. The optical recording and reproducing apparatus according to claim 7, wherein said light-receiving unit is composed of first to fifth light-receiving elements, said first to fifth light-receiving elements are located in the direction corresponding to the direction in which ± first-order diffracted lights are diffracted by said first and second diffraction areas of said diffraction element and said first to fifth light-receiving elements are respectively divided by four along the direction in which the tracks of said optical recording medium are arrayed and along the direction in which the track is extended.

13. The optical recording and reproducing apparatus according to claim 7, wherein said light-receiving unit is composed of first to fifth light-receiving elements including quadrant light-receiving areas, said first light-receiving element receives 0-th order light, said second and third light-receiving elements receive ± first-order diffracted lights diffracted by said first diffraction area of said diffraction element, said fourth and fifth light-receiving elements receive ± first-order diffracted lights diffracted by said second diffraction area of said diffraction element, when signals obtained from respective light-receiving areas of said first to fifth light-receiving elements are assumed to be A1 to A4, B1 to B4, C1 to C4, D1 to D4 and E1 to E4 from the clockwise direction of the light-receiving area, a tracking error signal TES is expressed as:

$TES=PPA-\{k1\times(PPC+PPE)-k2\times(PPB+PPD)\},$ where $PPA=(A1+A4)-(A2+A3)$, $PPB=(B1+B4)-(B2+B3)$, $PPC=(C1+C4)-(C2+C3)$, $PPD=(D1+D4)-(D2+D3)$, $PPE=(E1+E4)-(E2+E3)$, and k1 and k2 are arbitrary constants.

14. A tracking error signal detecting method in which light from a light source is irradiated on an optical recording medium through at least an objective lens and light reflected from said optical recording medium is detected at a light-receiving unit to thereby detect a tracking error signal (TES), comprising the steps of:

providing a diffraction element between said light source and said objective lens;

forming first and second diffraction areas with different pitches in said diffraction element;

forming shapes of gratings of said first and second diffraction areas such that ± first-order diffracted lights diffracted are received by said light-receiving unit at the position in which 0-th order light and ± first-order diffracted lights generated from guide grooves of said optical recording medium do not overlap with each other; and detecting the TES from reflected lights of respective ± first-order diffracted lights diffracted by said first and second diffraction areas and 0-th order light after said ± first-order diffracted lights and said 0-th order light were reflected on said optical recording medium, wherein said light-receiving unit is composed of first to fifth light-receiving elements including quadrant light-receiving areas, said first light-receiving element receives 0-th order light, said second and third light-receiving elements receive ± first-order diffracted lights diffracted by said first diffraction area of said diffraction element, said fourth and fifth light-receiving elements receive ± first-order diffracted lights diffracted by said second diffraction area of said diffraction element, when signals obtained from respective light-receiving areas of said first to fifth light-receiving elements are assumed to be A1 to A4, B1 to B4, C1 to C4, D1 to D4 and E1 to E4 from the clockwise direction of the light-receiving area, the TES is expressed as:

$TES=PPA-\{k1\times(PPC+PPE)-k2\times(PPB+PPD)\},$ where $PPA=(A1+A4)-(A2+A3)$, $PPB=(B1+B4)-(B2+B3)$, $PPC=(C1+C4)-(C2+C3)$, $PPD=(D1+D4)-(D2+D3)$, $PPE=(E1+E4)-(E2+E3)$, and k1 and k2 are arbitrary constants.

* * * * *